(12) United States Patent
Watanabe et al.

(10) Patent No.: US 7,183,761 B2
(45) Date of Patent: Feb. 27, 2007

(54) ROTATION SENSOR

(75) Inventors: Tomotaka Watanabe, Tokyo (JP);
Takehisa Ishihara, Tokyo (JP);
Shinsuke Terada, Tokyo (JP);
Takayuki Enomoto, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 11/058,206

(22) Filed: Feb. 16, 2005

(65) Prior Publication Data
US 2005/0184726 A1    Aug. 25, 2005

(30) Foreign Application Priority Data
Feb. 20, 2004 (JP) ............... 2004-044228
Sep. 16, 2004 (JP) ............... 2004-270567
Nov. 1, 2004 (JP) ............... 2004-317702
Nov. 1, 2004 (JP) ............... 2004-318321

(51) Int. Cl.
*G01B 7/30* (2006.01)
*H01F 5/00* (2006.01)

(52) U.S. Cl. .............. 324/207.25; 324/207.16
(58) Field of Classification Search .......... 324/207.16, 324/207.25, 521; 73/862.326
See application file for complete search history.

(56) References Cited

U.S. PATENT DOCUMENTS

| | | | | |
|---|---|---|---|---|
| 2,621,514 A | * | 12/1952 | Waugh | ............. 73/862.326 |
| 5,680,040 A | * | 10/1997 | Kawai et al. | ............. 324/86 |
| 6,348,790 B1 | * | 2/2002 | Aler et al. | ............. 324/207.25 |
| 6,472,863 B1 | * | 10/2002 | Garcia | ............. 324/173 |
| 6,675,124 B2 | * | 1/2004 | Koga | ............. 702/151 |
| 2004/0085063 A1 | * | 5/2004 | Jin et al. | ............. 324/207.16 |
| 2005/0030013 A1 | * | 2/2005 | Terada et al. | ............. 324/207.25 |
| 2006/0103377 A1 | * | 5/2006 | Hara et al. | ............. 324/207.25 |

FOREIGN PATENT DOCUMENTS

JP      2003-202240      7/2003

* cited by examiner

*Primary Examiner*—Anjan Deb
(74) *Attorney, Agent, or Firm*—Oblon, Spivak, McClelland, Maier & Neustadt, P.C.

(57) ABSTRACT

In a rotation sensor including a rotor 10 mounted to a rotating shaft S and having a conductive sensing unit 12 whereof the width varies in the circumferential direction; and stationary cores 31, 32, 41, 42 each including an exciting coil for forming a magnetic circuit with respect to the sensing unit of the rotor by allowing AC exciting current to flow therein, and a core body formed of magnetic material and retaining the exciting coil, and being mounted to the fixed member and disposed so as to oppose to the sensing unit of the rotor at a distance in the axial direction of the shaft, the stationary cores are disposed at two positions each having a central angle with respect to the axis of the shaft other than substantially 180°, so that the rotation sensor which is superior in mountability, is low in cost, and is superior in detection accuracy over a wider range is provided.

11 Claims, 36 Drawing Sheets

<Related Art>

<Related Art>

<Related Art>

<Related Art>

<Related Art>

<Related Art>

<Related Art>

ROTATION SENSOR

BACKGROUND

1. Field of the Invention

The present invention relates to a rotation sensor mounted to a rotor used for detecting a rotation angle of the rotor.

2. Description of the Related Art

For example, when detecting the rotation angle of a handle mounted to a rotational shaft, such as a steering shaft of a motor vehicle, integrally therewith, so-called a rotation sensor is used.

As an example of such a rotation sensor, there is the one having stationary cores arranged so as to oppose to a rotor at a predetermined distance (For example, see JP-A-2003-202240).

This rotation sensor includes, as shown in FIG. 1 to FIG. 3 of the above-described patent publication, includes a rotor mounted to a rotating shaft, stationary cores each having a core body formed of insulative magnetic material and at least one exciting coil accommodated in the core body, and a rotation angle detecting unit. The exciting coil includes, for example, four exciting coils, which are arranged at regular intervals in the circumferential direction of the rotor, respectively.

The stationary cores are mounted to a fixed member positioned in the vicinity of the shaft, and are accommodated with the rotor in a case formed of metal or insulative magnetic material having a shielding property with respect to an alternating magnetic field, respectively.

The rotor includes rotor mounting portion formed of the insulative magnetic material and a sensing unit connected thereto via a stay member and continuously varying in width circumferentially thereof. The sensing unit is formed of conductive metal having a narrow portion having the minimum width and a wide portion having the maximum width located on the radially opposite side of the narrow portion, and is formed so that the width in the radial direction of the sensing unit varies according to the rotation angle of the rotor, whereby an eddy current having a magnitude corresponding to the width in association with the rotation is induced by the alternating magnetic field.

By using the rotation sensor configured as described above, the rotation angle between 0° and 360° of the rotor is detected by the use of variations in impedance of the exciting coil in association with generation of the eddy current.

Subsequently, referring to the drawing, an example of the rotation sensor relating to the invention will be described. As shown in FIG. 1, for example, there is a case in which four stationary cores 841a, 841b, 841c, 841d (831a, 831b, 831c, 831d) are arranged at the rotation angle of 90° in the sensor. By arranging the stationary cores 841a, 841b, 841c, 841d (831a, 831b, 831c, 831d) in this manner, the surface area of a circuit board 895 accommodated in a rotation sensor 801 is secured as large as possible.

More specifically, the stationary cores 831a, 841a, the stationary cores 831b, 841b, the stationary cores 831c, 841c, and the stationary cores 831d, 841d are mounted to a fixed member 890 which is located in the vicinity of the shaft via the respective coil core holders 892a, 892b, 892c, 892d, and accommodated with a rotor 810 in a case 820 formed of metal or insulative magnetic material having a shielding property with respect to an alternating magnetic field, respectively.

The rotor 810 includes a rotor mounting portion 811 formed of insulative magnetic material and a sensing unit 812 connected thereto via a stay member and continuously varying in width circumferentially thereof. The sensing unit 812 is formed of conductive metal having a narrow portion having the minimum width and a wide portion having the maximum width located on the radially opposite side of the narrow portion, and is formed so that the width in the radial direction of the sensing unit 812 varies according to the rotation angle of the rotor 810, whereby an eddy current having a magnitude corresponding to the width in association with the rotation is induced by the alternating magnetic field. Then, by using the rotation sensor 801 configured as described above, the rotation angle between 0° and 360° of the rotor 810 is detected by the use of variations in impedance of the exciting coil in association with generation of the eddy current.

The circuit block diagram of the rotation sensor as described above includes, as shown in FIG. 2, an oscillating unit 900 having an oscillation circuit 901 for outputting oscillation signals of a specific frequency, phase shifting unit 910 (911, 912, 913, 914) for shifting the phase of the oscillation signals supplied from the oscillation unit 900 according to the magnitude of the eddy current generated at the sensing unit, a phase shifting amount detecting unit 920 (921, 922, 923, 924) for detecting the phase shifting amount, a phase shifting amount convert unit 930 (931, 932, 933, 934) for converting the detected phase shifting amount to corresponding parameter, an amplifying unit 940 (941, 942, 943, 944) for amplifying the phase shifting amount outputted from the phase shifting amount converting unit 930, and a rotation angle detecting unit 950 for calculating the rotation angle based on the output from the amplifying unit 940, so that the rotation angle supplied to the phase shifting unit 910 is detected.

The phase shifting unit 910 includes a resistor, a capacitor, and a coil of the electronic circuit. The sensing unit of the rotor is continuously varied in width in the circumferential direction as described above, the impedance of the coil varies by rotation of the sensing unit of the rotor, which is interlocked with the rotation of the rotating shaft.

When the rotating shaft rotates, the output from the phase shifting amount detecting unit 920 with respect to the input angle is determined by the shape of the sensing unit, and hence it can be changed as a Sin waveform shown in FIG. 3. For example, as regards the two fixed cores (coil A, coil B) disposed at a center angle of 90° with respect to the center of the rotating shaft of the rotor, the phase shifting amount as a result of the signal processing based on the variation in impedance of the coil A of the stationary core on one side and the phase shifting amount as a result of the signal processing based on the variation in impedance of the coil B of the other stationary core vary with the phase difference of 90° with respect to the input angle as shown in FIG. 4. Although four stationary cores are shown in FIG. 1, the phase shifting amounts relating to two other stationary cores (coil C, coil D) are omitted in FIG. 4.

Then, with the rotation sensor in this arrangement, the rotation angle of the rotor is detected using the variations in impedance of the exciting coil in association with generation of the eddy current.

Subsequently, problems in achieving improvement of assembleability and improvement of detection accuracy of the rotation sensor described above will be described.

A first problem in achieving improvement of the detection accuracy of the aforementioned rotation sensor will be described. When mounting the rotation sensor as described above to a steering shaft of a motor vehicle, for example, and detecting the rotation angle of the steering shaft, there is a case in which a gap between the sensing unit of the rotor and the coil core varies due to vibrations of the vehicle, which results in errors in detection of output, and hence the rotation angle cannot be detected precisely.

In order to solve this problem, as shown in FIG. 13 to FIG. 16 in JP-A-2003-202240, there is a proposed rotation sensor having a structure in which four pairs of stationary cores in pairs are mounted to a case with the intermediary of the sensing unit of the rotor. The respective stationary cores in pairs each include a core body formed of insulative magnetic material and an exciting coil to be accommodated in the core body. Then the specific exciting coils are connected in series, and a magnetic circuit is formed around the fixed core by the AC exciting current from a measuring unit.

By disposing four pairs of stationary cores, each includes an upper stationary core and a lower stationary core, at a phase of 90° with the intermediary of the sensing unit of the rotor on one rotation sensor, variations in output due to variations in distances with respect to the respective stationary cores in the radial direction of the rotor caused by vibrations at the rotating portion is alleviated.

However, since the sensing unit of the rotor is required to be disposed between the upper and lower stationary cores of the respective pairs of the stationary cores in the rotation sensor as described above, the assembly process is inevitably divided for each pair of the upper and lower stationary cores from the limit of actual assembly of the rotation sensor.

The specific assembly process will be described as an example. As shown in FIG. 5, lower stationary cores 51–54 are assembled to a coil core holder 71, the assembled coil core holder 71 is assembled to a lower case 22, and a sensing unit 12 integrated with a rotor 10 in advance is assembled to the lower case 22.

On the other hand, as shown in FIG. 6, upper stationary cores 61–64 are assembled to a coil core holder 72, the coil core holder 72 is incorporated into the coil core holder 71, and the upper case (not shown) is fitted to the lower case 22 to complete a rotary connector.

In other words, for assembling the rotary connector in this process, the coil core holder 71 (72) for holding the respective stationary cores 51–54 (61–64) is divided into two parts of coil core holders 71, 72, to which totally four upper stationary cores 61–64 are mounted respectively as in the case of the four pairs in total of the lower stationary cores 51–54.

Therefore, the coaxiality of the respective pairs of the upper and lower stationary cores 51–54, 61–64 depends on the positional accuracy of the upper and lower coil core holders 71, 72, hence it is difficult to assemble the rotation sensor in an ideal dimensional relation due to the part tolerance or assembly tolerance. Consequently, in order to achieve an accurate assembly, a facility corresponding thereto must be used, which increases the cost significantly.

When an attempt is made to integrate the coil core holders 71, 72, which are formed separately, a sensing unit 12 of the rotor 10 has to be capable of being slid and inserted between the integrated coil core holders from the side. In other words, the relation of a>b is required between the dimension a and the dimension b shown in FIG. 5 and FIG. 6, whereby the dimension of the rotary sensor itself is also increased.

In contrast to the structure as described above, a structure of providing integrated four pairs of coil core holders 81–84 for retaining the upper and lower stationary cores 51–54, 61–64 independently as shown in FIG. 7 and FIG. 8 is also contemplated. However, with this structure, the relative position of the respective pairs, that is, the arrangement at positions shifted by 90° from each other with respect to the axis of a shaft S is difficult. It is because that the relative positions between the respective pairs of the stationary cores 51–54, 61–64 depend on the accuracy of the mounting positions of the respective coil core holders 81–84 with respect to the lower case 22.

In this manner, it is difficult to assemble the rotation sensor in a state in which the sensing unit 12 of the rotor 10 is interposed at suitable position between the respective pairs of the stationary cores, while arranging the stationary cores so as to oppose to each other precisely.

Also, in order to assemble the rotation sensor as described above, the number of stationary cores required is eight in total, which results in high cost. In order to achieve cost reduction in the rotation sensor, it is effective to reduce the number of the stationary cores. However, in order to reduce the number of stationary cores, it is required to prevent the output characteristic of the rotation sensor from being impaired.

When the structure in which the stationary cores 51–54, 61–64 are disposed at four positions of the rotary sensor as described above is employed, there are various limits in assembly or component structure caused by necessity of the sensing unit 12 of the rotor 10 to be arranged between the opposed stationary cores, and a number of the stationary cores must be used for one rotation sensor, which is an obstacle for providing a cost-effective rotation sensor with high degree of accuracy.

Subsequently, a second problem in achieving improvement of the detection accuracy of the aforementioned rotation sensor will be described.

The rotation sensor 801 in the related art is configured as shown in FIG. 1, and is mounted to a steering shaft S of a vehicle via a sensor mounting member 300 (see FIG. 11). FIG. 9 shows a plan view of the rotation sensor 801 relating to the invention, and FIG. 10 shows a side view of the rotation sensor 801 relating to the invention. As is seen from FIG. 9 and FIG. 10, the case 820 includes an upper case 821 and a lower case 822, and the outer peripheral portion of the lower case 822 is fitted to a mounting rib 303 (see FIG. 11) of the sensor mounting member 300 described later. The lower case 822 is formed with an engagement projection 825 projecting therefrom. The engagement projection 825 for mounting the rotation sensor 801 to the sensor mounting member 300 is formed so as to project from the rotation sensor 801 at a circumferentially predetermined position slightly shifted rightward in the drawing when viewed in the longitudinal direction as shown in FIG. 9. By engaging the engagement projection 825 with an engaging notch 305 of the sensor mounting member 300, the rotation sensor 801 is mounted to the sensor mounting member 300. The lower case 822 is provided with a connector unit 826 for electrically connecting the detection circuit of the rotation sensor 801 and the external wire harness.

On the other hand, the sensor mounting member 300 includes, as shown in FIG. 11, a shaft insertion hole 301 for inserting the steering shaft S at the central portion thereof, and an abutting portion 302 which abuts against the case 820 of the rotation sensor 801 on the periphery thereof, and the abutting portion 302 is formed with the sensor retaining rib 303 on the outer periphery thereof. Part of the abutting portion 302 and the sensor retaining rib 303 are formed with the engagement notch 305 so as to engage with the engagement projection 825 provided with the rotation sensor 801. The sensor mounting member 300 is provided with a bracket, not shown, so as to fix the same to the vehicle.

Then, by passing the steering shaft S through the center portion of the rotation sensor 801 and fitting the outer periphery of the case of the rotation sensor 801 to the retaining rib 303 of the sensor mounting member 300 while engaging the engagement projection 825 of the rotation sensor 801 with the engagement notch 305 of the sensor mounting member 300, so that the rotation sensor 801 is mounted to the sensor mounting member 300.

When mounting the rotation sensor 801 to the sensor mounting member 300, in order to improve the detecting characteristic of the rotation sensor 801, the engagement projection 825 of the rotation sensor 801 and the engagement notch 305 of the sensor mounting member 300 are formed so that the rotation sensor 801 is mounted so as not to rattle in the circumferential direction in a state of being mounted and simultaneously so as to generate rattling to a certain extent in the radial direction in a state of being mounted in order to facilitate mounting of the rotation sensor 801 to the sensor mounting member 300.

Accordingly, the rotor 810 of the rotation sensor 801 is rotatably fixed together with the steering shaft S, and the case 820 of the rotation sensor 801 and the stationary cores 831*a*, 831*b*, 841*a*, 841*b* shown in FIG. 1 are mounted to the sensor mounting member 300 with rattling radially of the sensor to a certain extent.

The engagement projection 825 of the rotation sensor 801 is formed at a position shown in FIG. 9 as described above is in the case in which there are various constrains in mounting dimension with respect to the engagement notch 305 formed on the sensor mounting member 300 or the like.

The stationary cores 831*a*, 831*b*, 841*a*, 841*b* provided on the rotation sensor 801 are disposed at positions as shown in FIG. 1 at rotation angles of 90° from each other, so that the surface area of a circuit board 895 in the rotation sensor remains as large as possible as described above.

When the engagement projection 825 of the rotation sensor 801 (see FIG. 9 and FIG. 10), the stationary cores 831*a*, 841*a* (coil A) and the stationary cores 831*b*, 841*b* (coil B) are in such a positional relation, the stationary cores 831*b*, 841*b* on the right side in FIG. 1 are positioned in the vicinity of the engagement projection 825 with respect to the rotation sensor 801, while the stationary cores 831*a*, 841*a* on the left side in the figure are positioned at a position significantly apart form the engagement projection 825 of the rotation sensor 801.

FIG. 12 is a characteristic drawing showing a relation between an angle formed between a connecting line (mounting reference line) between the center axis of the steering shaft S and the engagement projection 825 and the connecting portion between the steering shaft S and the stationary cores 831*a*, 831*b*, 841*a*, 841*b* shown on the lateral axis and the degree of influence of circumferential displacement of the rotation sensor 801 generated by displacement of the engagement projection 825 radially of the sensor shown in the vertical axis.

As will be understood from FIG. 12, since the stationary cores 831*a*, 841*a* (corresponding to the coil A in FIG. 12) on the left side in FIG. 1 is significantly displaced in the circumferential direction with respect to the connecting line between the axis of the steering shaft S and the engagement projection 825, radial displacement of the rotation sensor 801 gives significant influence to circumferential displacement of the rotation sensor 801. When such an influence is significant even on one of the stationary cores, the detection characteristic of the entire rotation sensor is adversely affected.

Subsequently, a third problem in achieving improvement of the detection accuracy of the aforementioned rotation sensor will be described.

In the rotation sensor in the related art, the sensing unit of the rotor is fixed to the rotating shaft, and the exciting coil is fixed to the case via the stationary core. In other words, when mounting the rotation sensor, the rotor side of the rotation sensor is mounted to the rotating shaft, and the stator side is mounted to the portion other than the rotating shaft via a bracket or the like. Therefore, there may arise a displacement between the sensing unit of the rotor and the exciting coil to a certain extent in order to achieve improvement of the mounting property of the rotation sensor. It causes no problem when the displacement is within a tolerance. However, when the displacement exceeds the tolerance, an unallowable displacement is generated in phase shifting amount with respect to the input angle as shown in FIG. 13 due to rattling between the sensing unit of the rotor and the exciting coil and the temperature characteristic of the coil or the like. In FIG. 13, a case in which the phase shifting amount is displaced (displaced vertically in the graph) is shown. However, there may be a case in which the input angle is displaced (displaced laterally in the graph), and displacement in both directions may occur. Actually, between the sensing unit of the rotor and the exciting coil, displacement in the radial direction of the sensing unit may easily occur. At this time, in a rotation angle detecting unit 950 (see FIG. 2), the angle which is displaced from the actual input angle is detected as is. However, only with the present structure, it is difficult to detect occurrence of such a displacement which is acceptable. Supposing that an attempt is made to detect such displacement, additional parts are required, which results in increase in cost. In this manner, since it is difficult to discriminate variation in detection output caused by rattling between the sensing unit of the rotor and the exciting coil or the temperature from essential variations in detecting angle, when unexpected displacement occurs, it cannot be diagnosed as an abnormal state, and hence the rotation angle may be erroneously detected. When the unallowable positional displacement between the sensing unit of the rotation sensor and the exciting coil as described above can be determined, a countermeasure such as canceling the sensor output signal can be taken as needed. However, as long as the positional displacement as such cannot be determined, it is difficult to take a suitable countermeasure.

SUMMARY

A rotation sensor according to the invention includes a rotor mounted to a rotating shaft and including a conductive sensing unit whereof the width varies in the circumferential direction:

stationary cores each including an exciting coil for forming a magnetic circuit with respect to the sensing unit of the rotor by allowing AC exciting current to flow therein, and a core body formed of magnetic material and retaining the exciting coil, and being mounted to the fixed member and disposed so as to oppose to the sensing unit of the rotor at a distance in the axial direction of the shaft, wherein the stationary cores are disposed at two positions each having a central angle with respect to the axis of the shaft other than substantially 180°.

DESCRIPTION OF THE PREFERRED EMBODIMENTS

Figure 1:
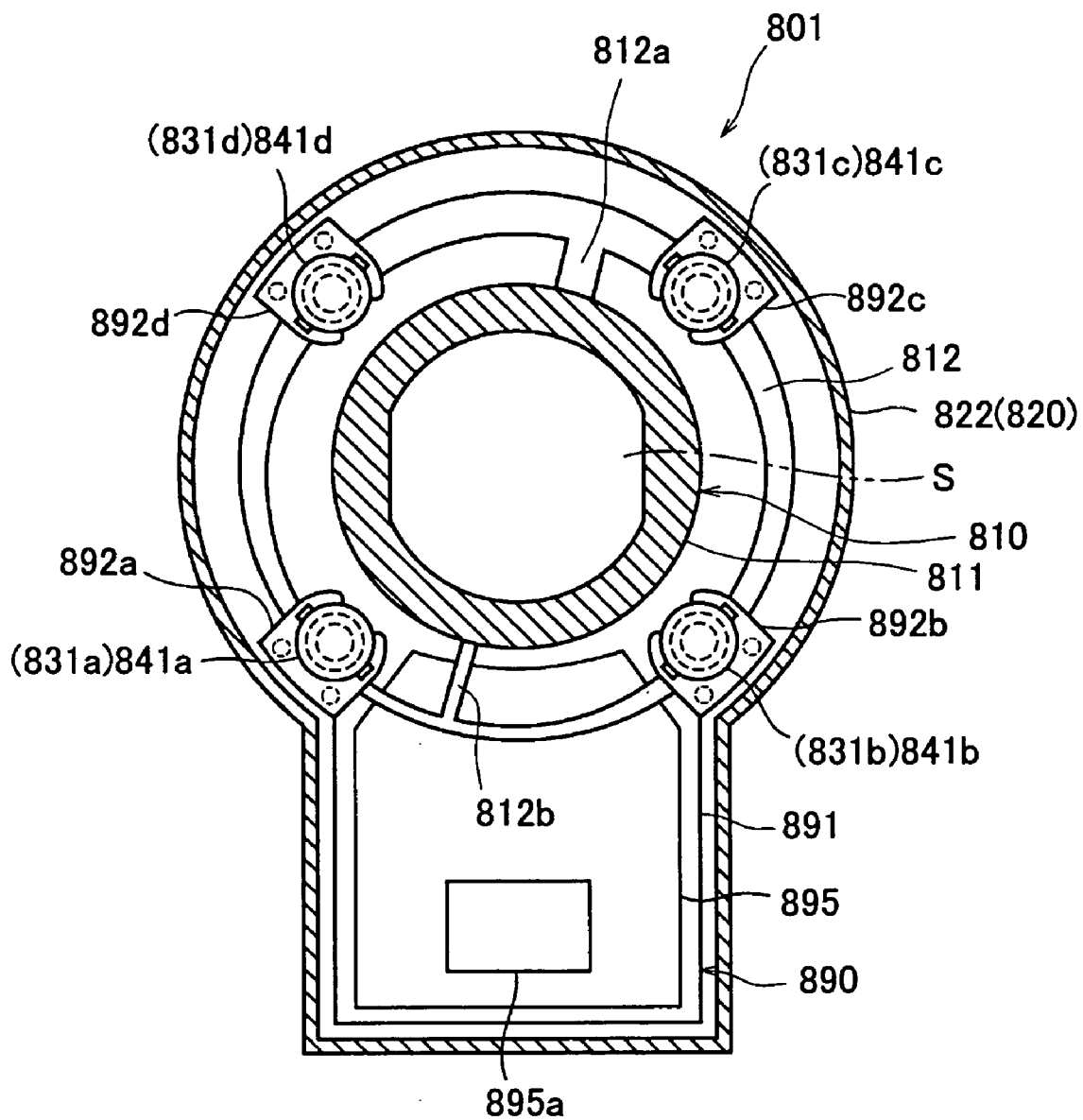
FIG. 1 is a plan view showing an internal structure of a rotation sensor relating to the invention.
Figure 2:
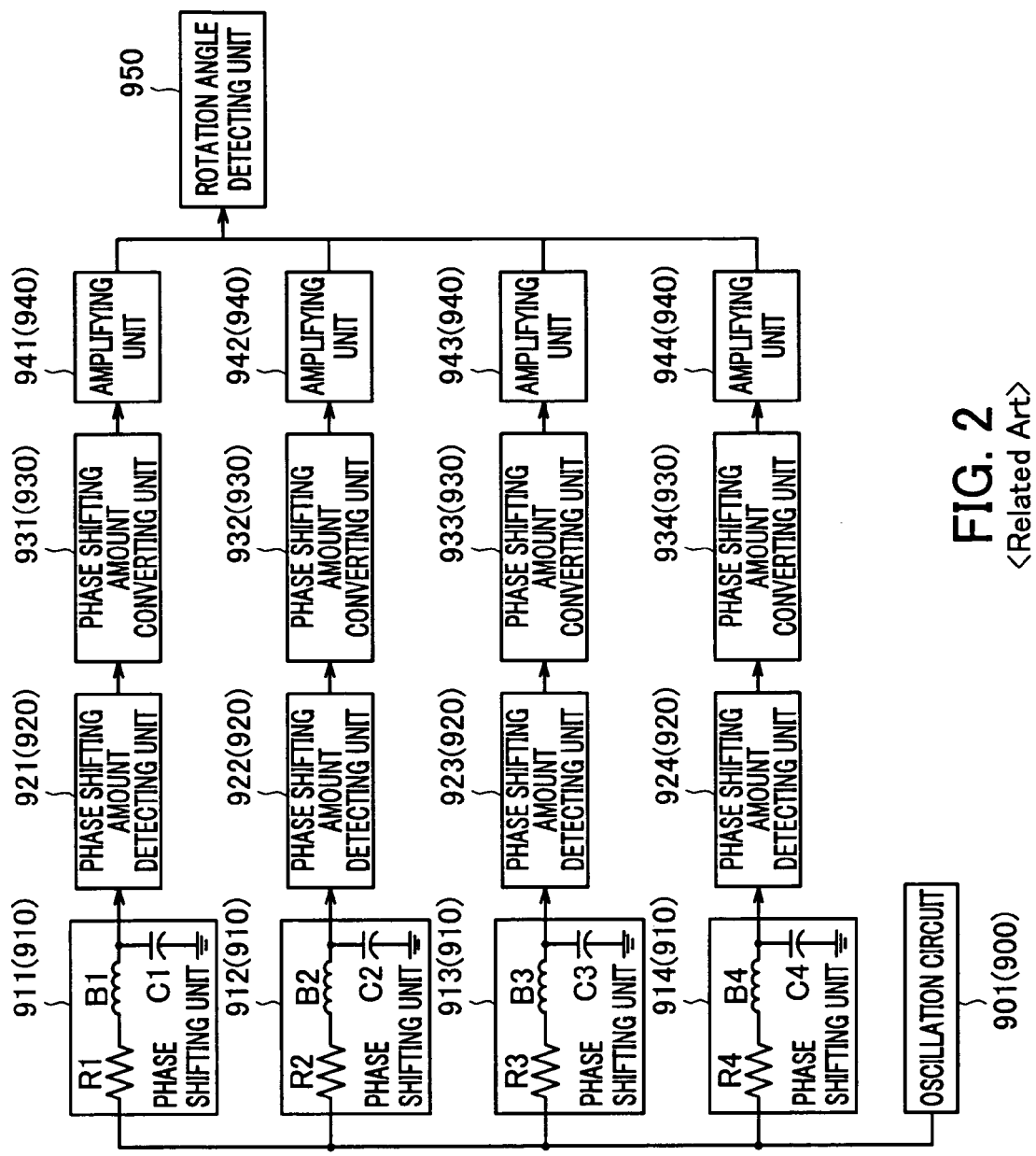
FIG. 2 is a circuit block diagram of the rotation sensor relating to the invention.
Figure 3:
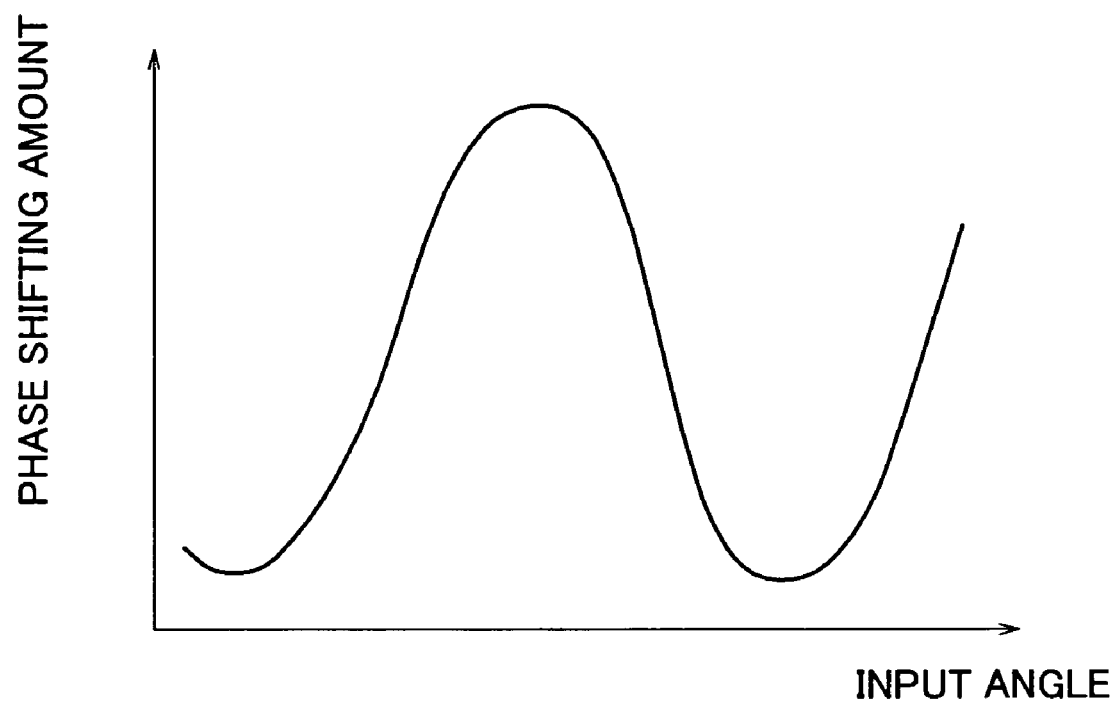
FIG. 3 is a characteristic drawing of detection of a phase shifting amount of a specific coil core of the rotation sensor relating to the invention.
Figure 4:
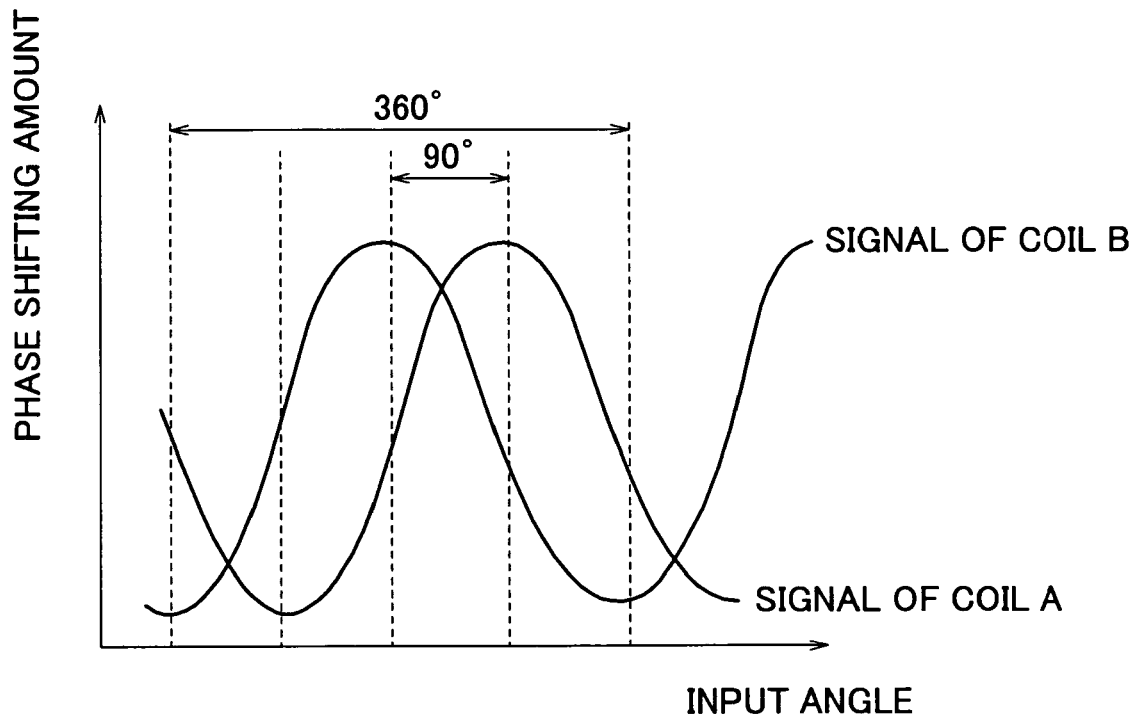
FIG. 4 is a characteristic drawing of detection of the phase shifting amount in the case in which the coil cores are disposed to form a center angle of 90°.
Figure 5:
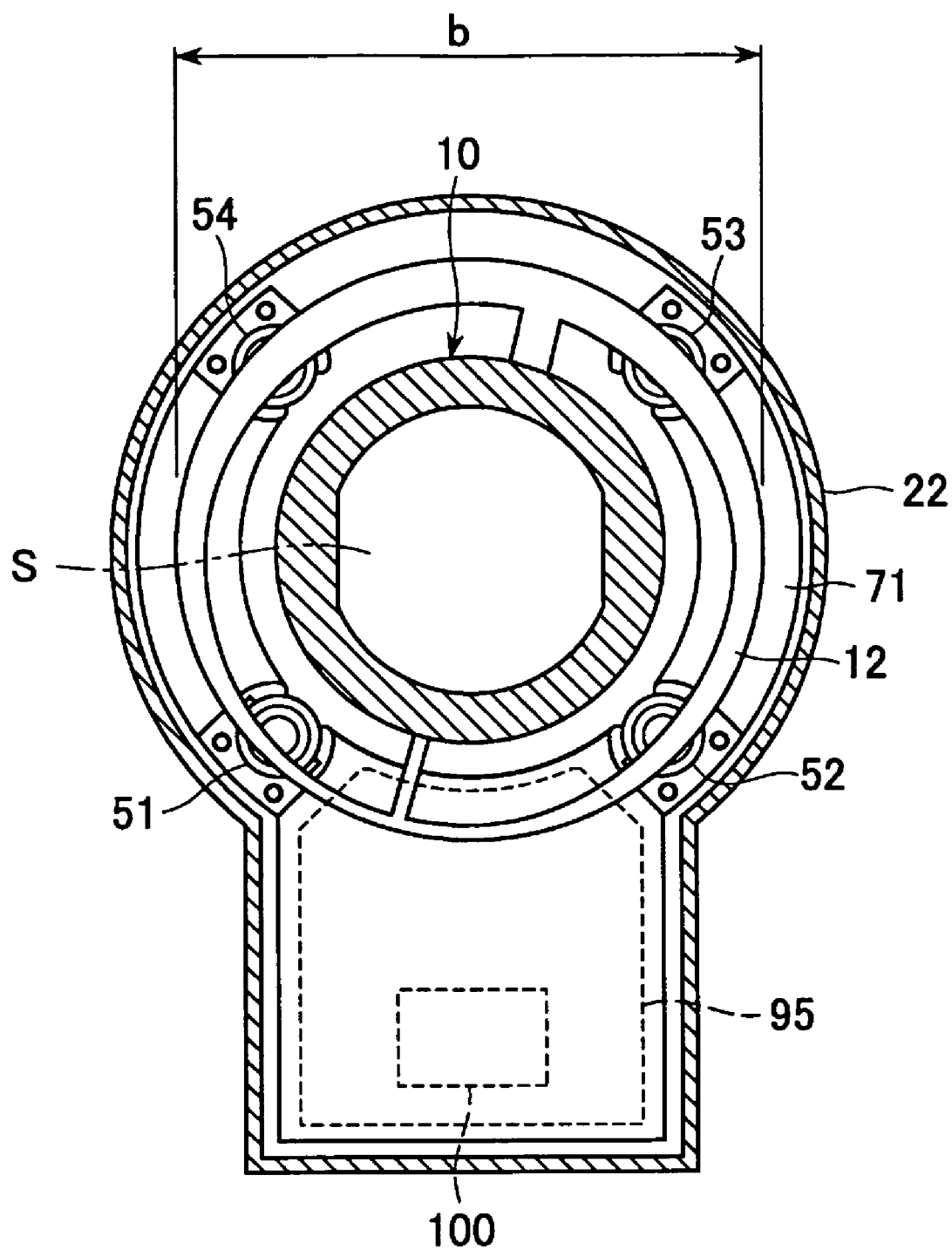
FIG. 5 is a plan view showing an internal structure of the rotation sensor, which is different from the one shown in FIG. 1 relating to the invention.
Figure 6:
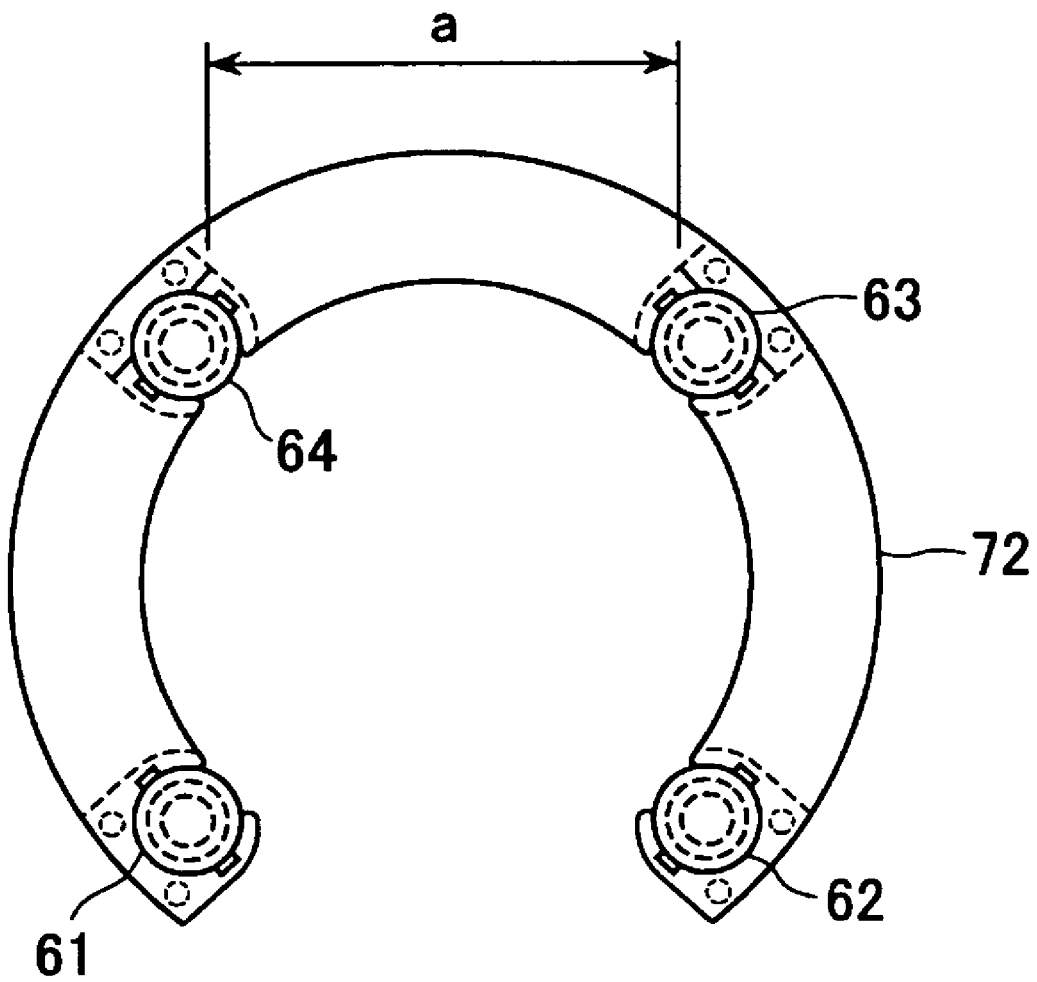
FIG. 6 is a plan view showing an upper stationary core and an upper retaining member of the rotary sensor shown in FIG. 5.
Figure 7:
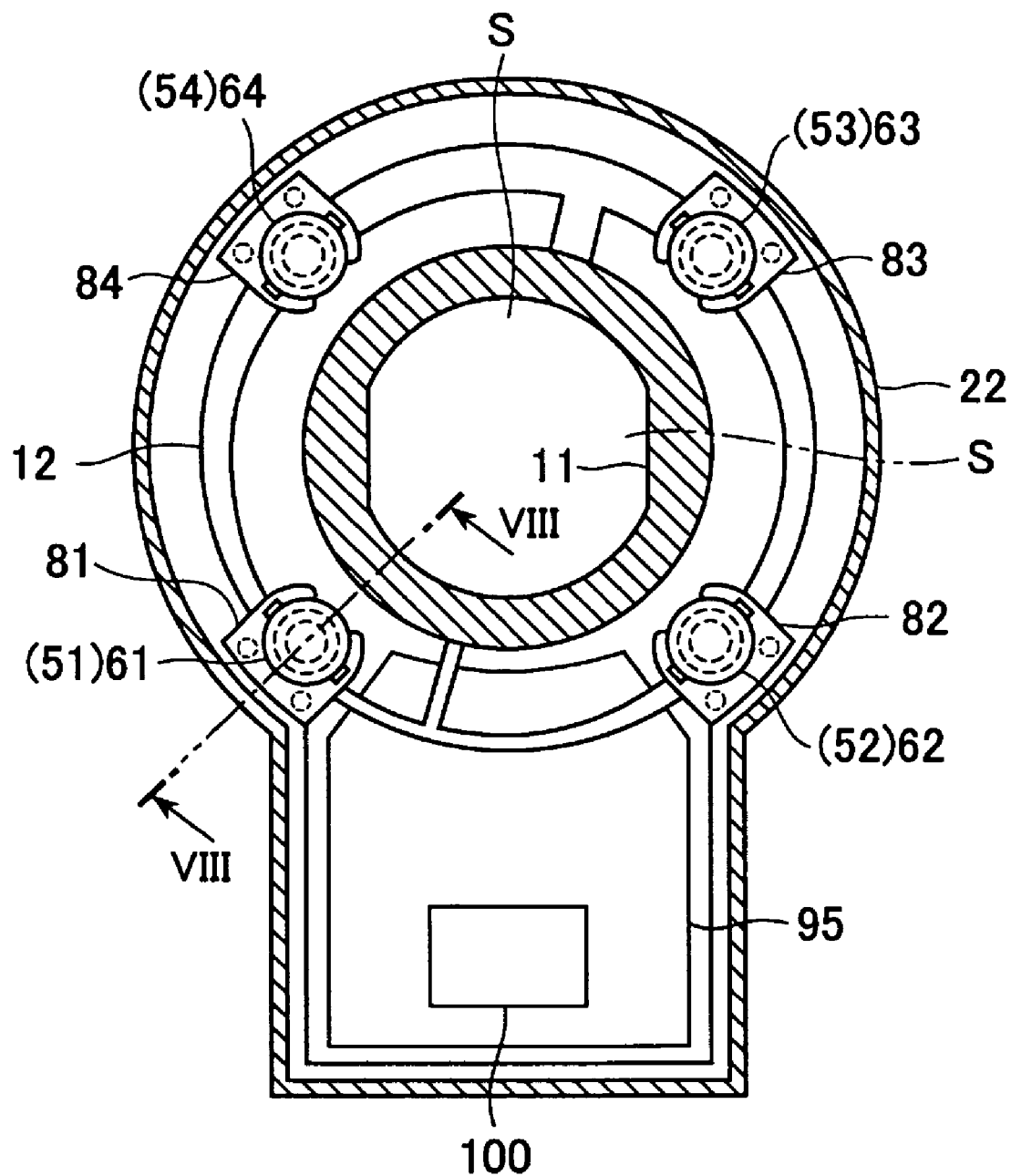
FIG. 7 is a plan view showing an internal structure of the rotation sensor which is different from the one shown in FIG. 6 relating to the invention.
Figure 8:
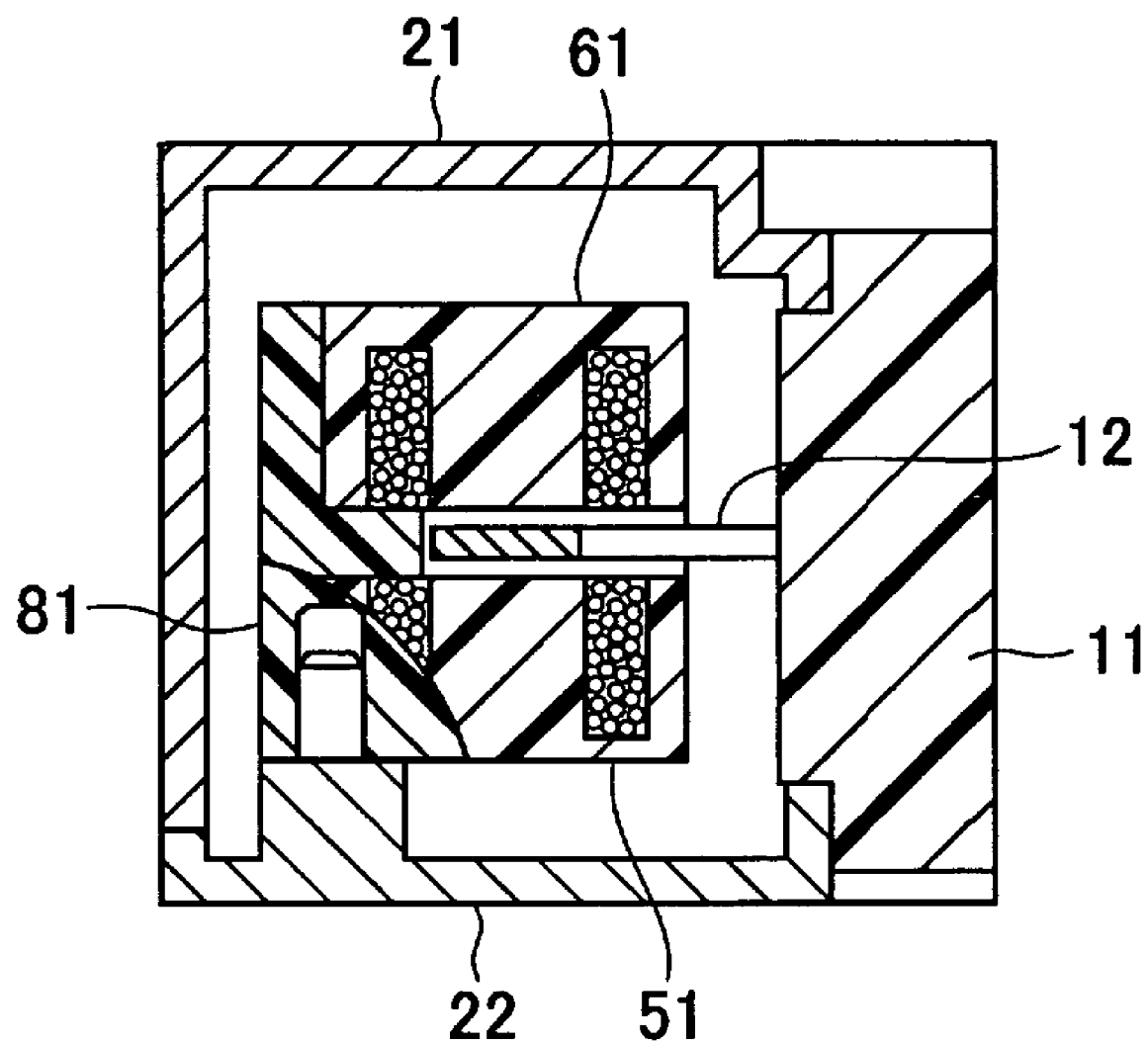
FIG. 8 is a cross-sectional view of the rotation sensor taken along the line VIII—VIII shown in FIG. 7.

Referring now to the drawings, a rotation sensor according to the respective embodiments of the invention will be described.

In this description a case in which the rotation sensor is mounted to a steering shaft in a steering device of a motor vehicle for detecting the rotation angle of a handle is detected will be described.

A rotation sensor 1 according to a first embodiment of the invention will be described first.

Figure 14:
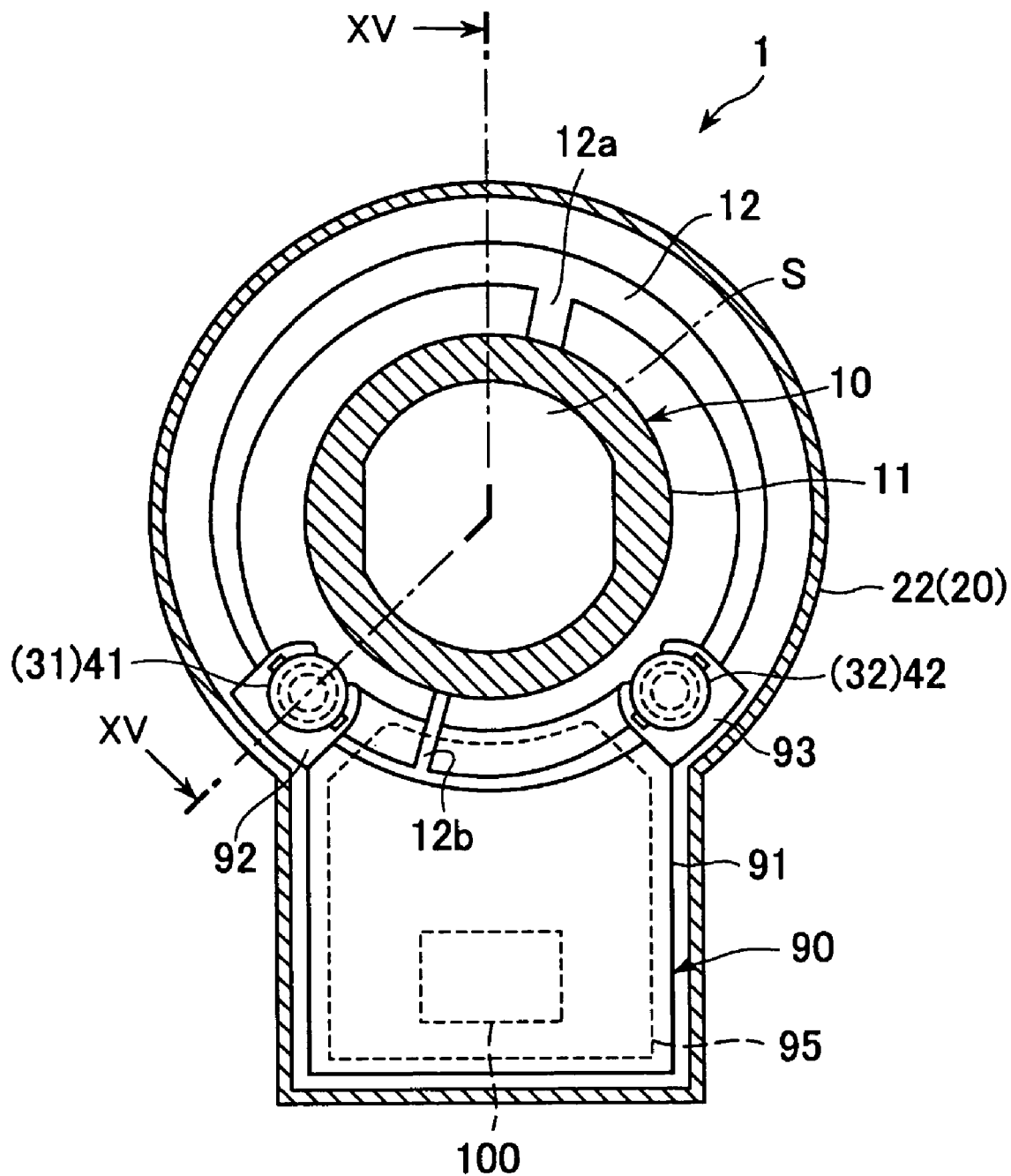
FIG. 14 is a plan view of the internal structure of the rotation sensor according to a first embodiment of the invention.
Figure 15:
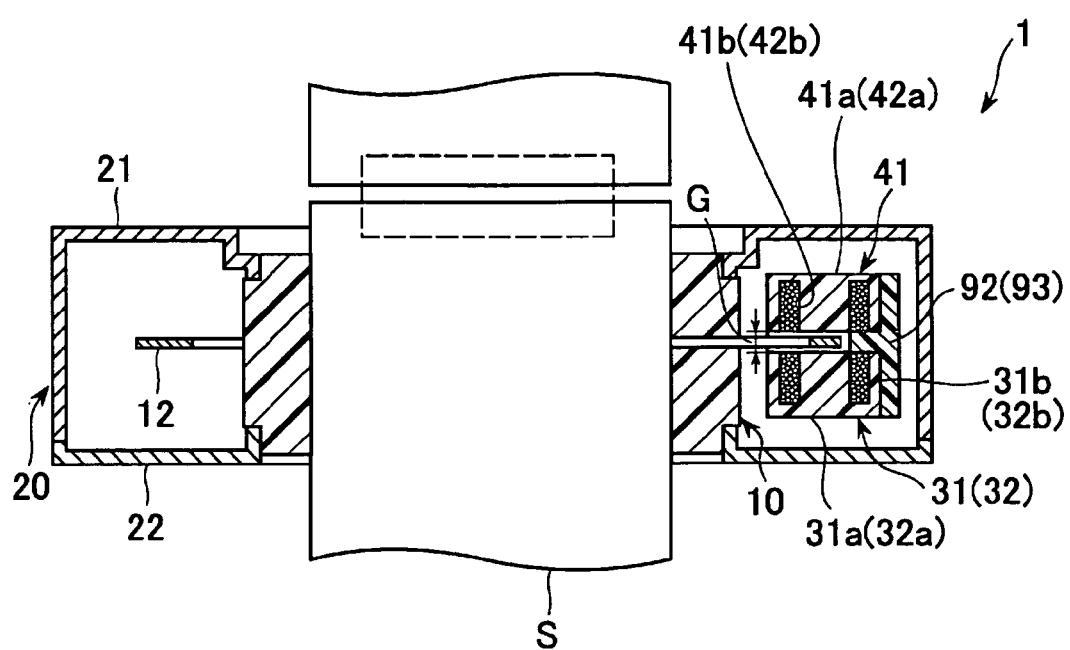
FIG. 15 is a cross-sectional view of a state in which the rotation sensor is mounted to the steering shaft taken along the line XV—XV in FIG. 14.

As shown in FIG. 14 and FIG. 15, the rotation sensor 1 according to the first embodiment of the invention includes a rotor 10 to be mounted to a rotating shaft S, stationary cores 31, 32 (41, 42) each includes a core body formed of insulative magnetic material and at least one exciting coil to be accommodated in the core body, a retaining member 90 for retaining the stationary cores 31, 32 (41, 42), a circuit board 95 provided in part of the retaining member 90, and a case 20 for accommodating these elements. The retaining member 90 includes a coil core holder 92 for arranging the stationary cores 31, 41 so as to oppose to each other, and a coil core holder 93 for arranging the stationary cores 32, 42 so as to oppose to each other. The retaining member 90 is assembled to the rotation sensor 1 so that the coil core holders 92, 93 form a center angle of 90° with respect to the axis of the shaft S.

The structures of the retaining member 90 and of the stationary cores 31, 32, 41, 42 will be described in detail below. The retaining member 90 is a square plate member formed, for example, of synthetic resin (for example, polybutylene terephthalate (PBT), nylon, polyphenylene sulfide (PPS), acrylonitrile-butadiene-styrene (ABS) resin, or fiber reinforced plastic (FRP) which is glass fiber impregnated with epoxy resin, and includes a base portion 91 to be mounted to a lower case 22 and the coil core holders 92, 93 provided at one side end of the base portion 91.

Figure 16A:
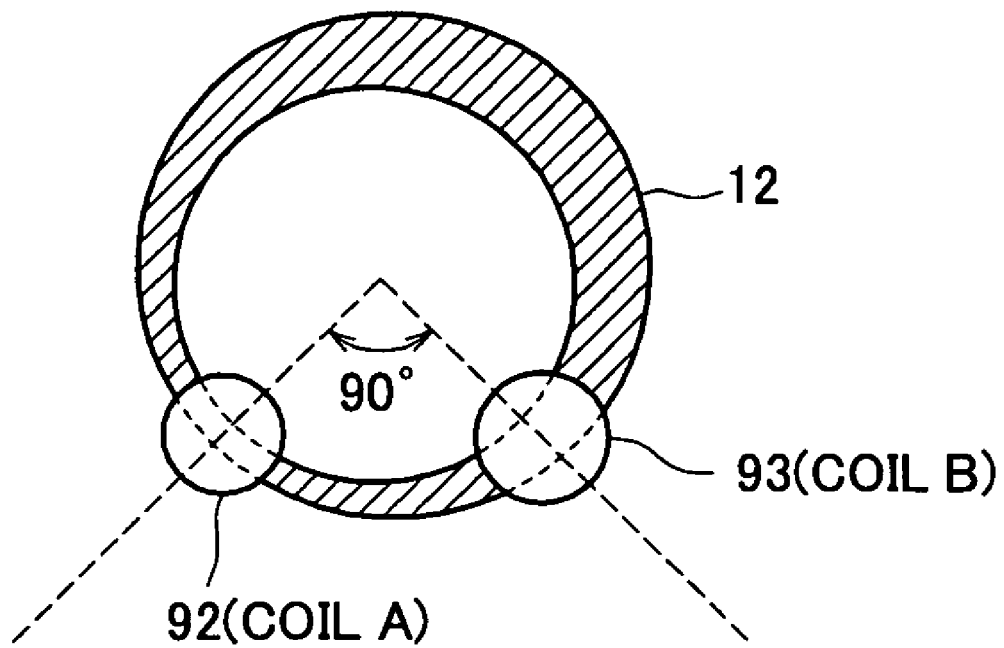
FIG. 16 shows a plan view (FIG. 16A) showing the layout of the rotor sensing unit of the rotation sensor and the coil core of the rotation sensor shown in FIG. 14, and a circuit drawing (FIG. 16B) relating to the exciting coil thereof.
Figure 16B:
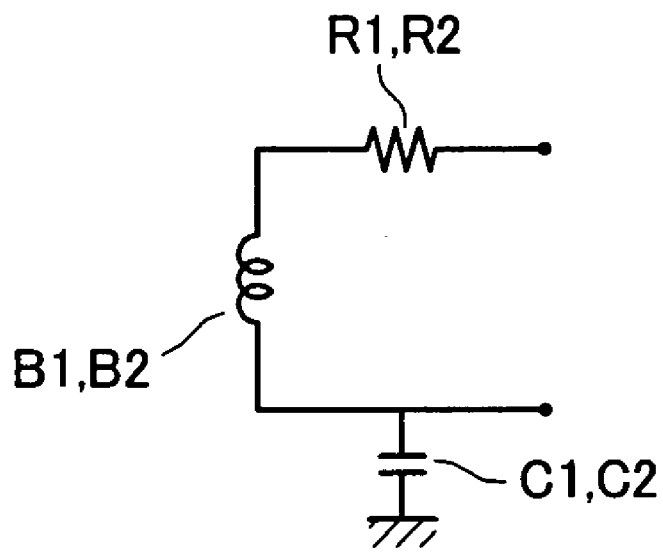

The coil core holder 92 of the retaining member 90 is provided with the stationary cores 31, 41 in a state of being opposed to each other while keeping the concentricity thereof, and the other coil core holder 93 of the retaining member 90 is provided with the stationary cores 32, 42 in a state of being opposed to each other while keeping the concentricity thereof. The pair of the stationary cores 31, 41 is arranged with respect to the other pair of the stationary cores 32, 42 so as to form a center angle of 90° with respect to the axis of the shaft S. Accordingly, the stationary core on one side 31 (32) is opposed to the stationary core on the other side 41 (42) with the intermediary of the rotor 10 at a predetermined distance G (see FIG. 15). The coil core holder 92 and the coil core holder 93 are assembled to a rotation sensor 401 so as to form a center angle of 90° with respect to the axis of the shaft S, as shown in FIG. 16A. In other words, a coil A of one pair is disposed to form a center angle of 90° from a coil B of the other pair with respect to the axis of the shaft S. An oscillation circuit 111, described later, is adapted to transmit an oscillation signal of a specific frequency to the respective exciting coils (coil A, coil B) as shown in FIG. 16B. Accordingly, the respective oscillation signals are outputted to respective phase shifting units 120 (see FIG. 17) including resistances R1, R2, coils B1, B2, and capacitors C1, C2 as shown in FIG. 16B.

The retaining member 90 is provided partly with the circuit board 95, and the circuit board 95 is provided with a rotation angle detecting circuit 100. The rotation angle detecting unit 100 is adapted to be connected to a wire harness for supplying the power source and transmitting signals via a plurality of cables (not shown) extended outward from the case 20 and also to an external device provided outside the case 20.

As described above, the stationary cores 31, 32 are disposed on the lower case side of the retaining member 90 so as to form a center angle of 90° with respect to the axis of the shaft S. On the other hand, the stationary cores 41, 42 are disposed on the upper case side of the retaining member 90 so as to form a center angle of 90° with respect to the axis of the shaft S.

The stationary core 31 and the stationary core 41 are opposed to each other with the intermediary of a sensing unit 12 of the rotor 10 while keeping the concentricity thereof, and the stationary core 32 and the stationary core 42 are also opposed to each other with the intermediary of the sensing unit 12 of the rotor 10 while keeping the concentricity thereof.

As shown in FIG. 15, the stationary cores 31, 32 on one side, being formed of insulative magnetic material (for example, Ni—Zn ferrite, Mn—Zn ferrite, or Mg—Zn ferrite mixed with thermoplastic synthetic resin having electrical insulating property such as nylon, polypropylene (PP), polyphenylene sulfide (PPS), or acrylonitrile-butadiene-styrene (ABS) resin, or ceramic), and formed into a column-shape, and include core bodies 31a, 32a each having a ring-shaped void for accommodating the exciting coil on an upper surface side and exciting coils 31b, 32b to be accommodated in the core bodies 31a, 32a. Likewise, the stationary cores 41, 42 on the other side include core bodies 41a, 42a formed of insulative magnetic material and exciting coils 41b, 42b to be accommodated in the core bodies 41a, 42a. The pair of the exciting coil 31b and the exciting coil 41b, and the pair of the exciting coil 32b and the exciting coil 42b are respectively connected in series, are connected to the rotation angle detecting circuit 100 of the retaining member 90 and generate alternating magnetic field around the coils by being supplied with AC exciting current, so that a magnetic circuit is formed between the stationary cores of each pair.

The retaining member 90 provided with the stationary cores 31, 32 (41, 42), the circuit board 95 provided with the rotation angle detecting circuit 100, and the rotor 10 are accommodated in the case 20 formed of metal or insulative magnetic material having a property for shielding the alternating magnetic field. The case 20 includes an upper case 21 and the lower case 22, and is mounted to the fixed member (not shown) located in the vicinity of the shaft S via the bracket, or the like not shown.

As shown in FIG. 14, the rotor 10 includes a rotor mounting portion 11 formed of insulative magnetic material and the sensing unit 12 connected to the rotor mounting portion 11 via stay members 12a, 12b and being continuously changed in width in the circumferential direction. The sensing unit 12 is formed of metal having conductivity such as aluminum, copper, silver, or brass. As shown in the same drawing, the sensing unit 12 includes a narrow portion which has a narrowest width and a widened portion which has a widest portion on the radially opposite side thereof. Then, it is formed so as to vary in radial width corresponding to the rotation angle of the rotor 10, so that an eddy current having a magnitude based on the surface area corresponding to the respective coils and the width of a sensing unit is induced by the AC current, described later, in association with the rotation of the rotor 10.

In other words, when the AC exciting current is flowed through the respective exciting coils 31b, 32b, 41b, 42b, the respective exciting coils 31b, 32b, 41b, 42b generate an alternating magnetic field in the periphery thereof, and the opposing core body 31a and the core body 41a establish a magnetic circuit in cooperation with each other. Likewise, the opposing core body 32a and the core body 42a establish the magnetic circuit in cooperation with each other. When a magnetic flux crosses the sensing unit 12, an eddy current is induced on the surface of the sensing unit 12, whereby the impedances of the respective exciting coils 31b, 32b, 41b, 42b are varied. The amount of variation of the impedance corresponds to variations in the amount of eddy current induced on the surface of the sensing unit 12. The amount of eddy current induced on the surface of the sensing unit 12 varies depending on the surface area of the sensing unit 12 corresponding to the stationary core (the projecting area with respect to the stationary core of the sensing unit when viewed from the direction orthogonal to the sensing surface of the sensing unit 12, that is, "the projecting area on the stationary core of the sensing unit"). Therefore, when the rotor 10 rotates, the width of the sensing unit 12 corresponding to the respective stationary cores 31, 32, 41, 42 varies in proportion with the rotation angle of the rotor 10, and accordingly, the impedances in the respective exciting coils 31*b*, 32*b*, 41*b*, 42*b* vary. The output signals from the respective exciting coils 31*b*, 32*b*, 41*b*, 42*b* at this time are detected by the rotation angle detecting circuit 100, described later, and converted into the angle signal of the rotor 10, so that the rotation angle of the rotor 10 can be detected.

Figure 17:
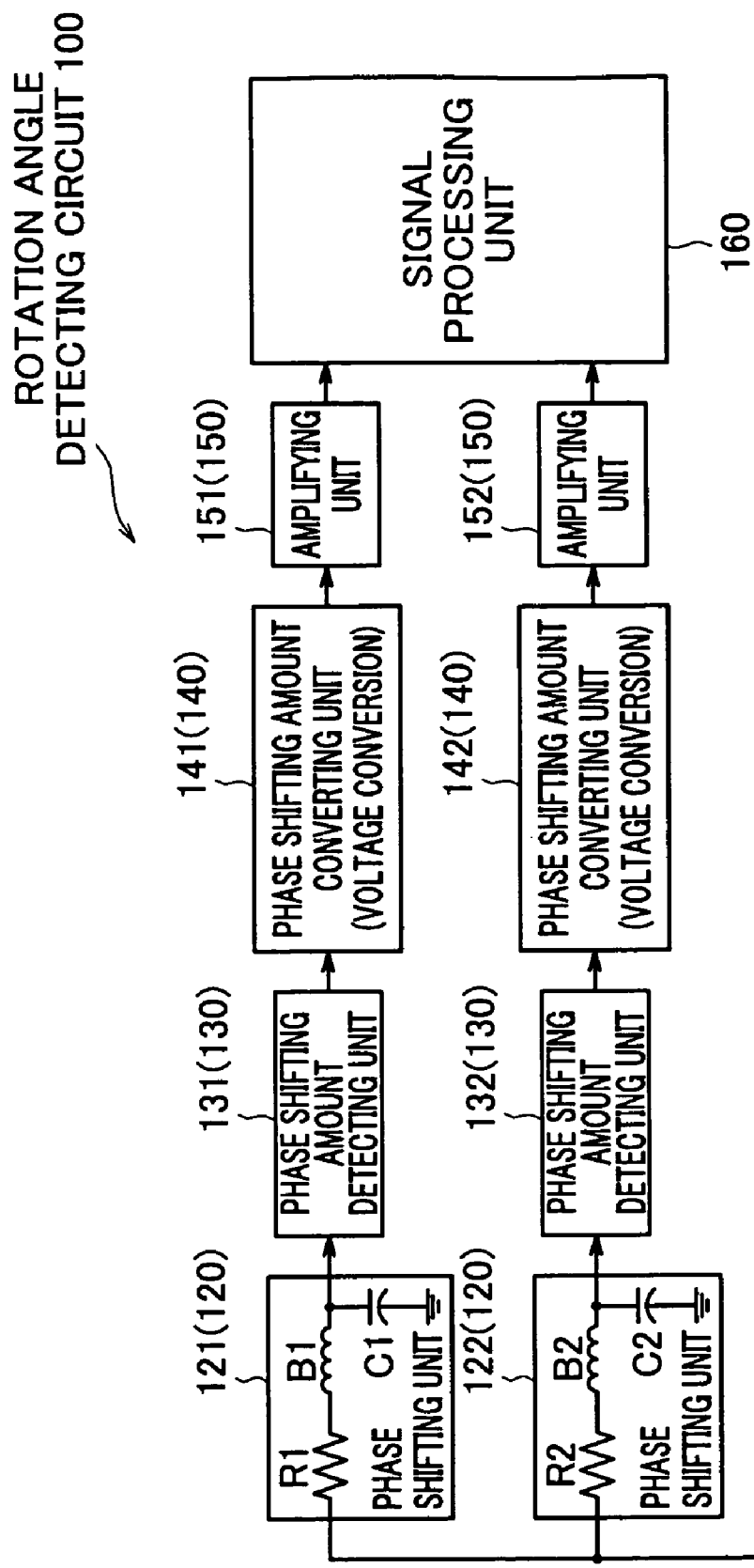
FIG. 17 is a circuit block diagram explaining a signal processing circuit of the rotation sensor shown in FIG. 14.

As shown in the circuit block diagram in FIG. 17, the rotation angle detecting circuit 100 of the rotation sensor 1 includes the oscillation unit 110 including an oscillation circuit 111 for outputting the oscillation signals of a specified frequency, the phase shifting portion 120 (121, 122) for shifting the phase of the oscillation signals supplied from the oscillation unit 110 depending on the magnitude of the eddy current generated at the sensing unit 12, a phase shifting amount detecting unit 130 (131, 132) for detecting the phase shifting amount, a phase shifting amount converting unit 140 (141, 142) for converting the detected phase shifting amount into a corresponding parameter, an amplifying unit 150 (151, 152) for amplifying the phase shifting amount outputted from the phase shifting amount converting unit 140, and a signal processing unit 160 for calculating the rotation angle from the parameter corresponding to the phase shifting amount, so that the respective rotation angles supplied to the phase shifting unit 120 are detected. Although not stated in this embodiment, it is also possible to provide a frequency dividing circuit or a buffer amplifier between the oscillation circuit 111 and the phase shifting unit 120 as needed.

The rotation sensor 1 configured as described later is adapted to be capable of detecting over the entire rotation angle of the rotor from 0° to 360° as described above by performing signal processing on the output by the rotation angle detecting circuit 100 utilizing variations in impedances of the exciting coils 31*b*, 32*b*, 41*b*, 42*b* by the rotation of the shaft S.

Subsequently, a method of assembly of such a rotation sensor will be described. Firstly, the stationary cores 31, 41 are mounted to the coil core holder 92 of the retaining member 90, and then the stationary cores 32, 42 are mounted to the coil core holder 93 of the retaining member 90. Then, the sensing unit 12 of the rotor 10 is inserted between the stationary cores arranged on the retaining member 90 so as to oppose to each other. Accordingly, in a state in which the stationary cores 31, 41 of one pair are concentrically kept and the stationary cores 32, 42 of the other pair are concentrically kept, the sensing unit 12 of the rotor 10 is disposed between the stationary cores of each pair at suitable positions. Then, the retaining member 90 and the rotor 10 assembled provisionally in this manner are mounted to the lower case 22. Subsequently, the upper case 21 is mounted to the lower case 22 to complete assembly of the rotation sensor 1.

In this manner, since the rotation sensor 1 according to the first embodiment of the invention does not have a structure to mount the retaining member including two or more parts, it can be assembled easily while keeping concentricity between the respective stationary cores and keeping the distance between the respective stationary cores 31, 41 (32, 42) and the sensing unit 12 of the rotor 10 at a constant distance.

In other words, while four pairs in total of stationary cores including upper and lower pairs are arranged with the intermediary of the sensing unit of the rotor at the phase of 90° in the rotation sensor relating to the invention as described above, two pairs in total of the stationary cores including the upper and lower pairs are disposed on the retaining member 90 with the intermediary of the sensing unit of the rotor at a center angle of 90° with respect to the axis of the shaft in the rotation sensor according to the first embodiment of the invention. The retaining member 90 for retaining the respective stationary cores 32, 42 is configured in integrated state as a unit including the coil core holders 92, 93. Since the retaining member 90 is provided with the rotation angle detecting circuit 100 via the circuit board 95, the stationary cores 31, 32, 41, 42 are disposed at positions near the rotation angle detecting circuit 100.

Since the rotation sensor 1 according to the first embodiment has a structure as described above, the sensing unit 12 of the rotor 10 can be assembled by sliding from the side with respect to the retaining member 90, and hence it is no longer necessary to divide the retaining member 90 into two pieces for the upper and lower stationary cores. Also, it is not necessary to divide the retaining member 90 for each pair of the stationary cores configured of four pairs. Consequently, reduction of the number of parts of the components is achieved.

In addition, according to the rotation sensor 1 of the first embodiment, since the retaining member 90 for retaining the respective stationary cores is a single part, the concentricity of the stationary cores 31, 41 (32, 42) of each pair opposed to each other or the relative position between the stationary cores 31, 42 (32, 42) of each pair disposed apart from each other by 90° are not influenced by the assembly error between parts, and hence between the sensing unit 12 of the rotor 10 and the stationary cores 31, 32, 41, 42, or between the stationary cores can be positioned with high degree of accuracy in an assembly process of the rotation sensor 1.

In the case of the rotation sensor 1 according to the first embodiment, since both of the two pairs of the stationary cores 31, 32, 41, 42 are disposed in the vicinity of the rotation angle detecting circuit 100 provided on the retaining member 90, the length of the coil wire used for electrical connection between the rotation angle detecting circuit 100 and the stationary cores 31, 32, 41, 42 can be reduced, whereby it is hardly influenced by the electrical noise.

Subsequently, a method of performing the specific signal processing for detecting the rotation angle using the rotation sensor 1 assembled as described above will be described. Firstly, the oscillation circuit 111 transmits an oscillation signal of a specific frequency to the respective exciting coil 31*b* and the exciting coil 41*b* (coil B1) and the exciting coil 32*b* and the exciting coil 42*b* (coil B2).

Accordingly, the respective oscillation signals are outputted to the respective phase sifting units 120 including the resistances R1, R2, the exciting coils B1, B2 and the capacitors C1, C2. At this time, the phase of the voltage signal at both ends of the capacitors C1, C2 varies with variations in impedance of the exciting coils B1, B2. The voltage signals at both ends of the capacitors C1, C2 are outputted to the respective phase shifting amount detecting units 130. The respective phase shifting amount detecting units 130 detect the phase shifting amounts of the voltage signals at both ends of the capacitors C1, C2, respectively. The respective phase shifting amount converting units 140 convert the detected respective phase shifting amounts to the corresponding voltages.

Then, the voltage values are transmitted to the amplifying units 150 (151, 152) connected to the rear stage of the phase shifting amount converting unit 140. The amplifier 150 is an electronic circuit including an operational amplifier.

The signal processing unit 160 employs a one-chip microprocessor as processing means, in which the signal processing unit 160 measures the rotation angle of the rotor 10 based on the voltage value supplied from the respective amplifying units 150.

Figure 18:
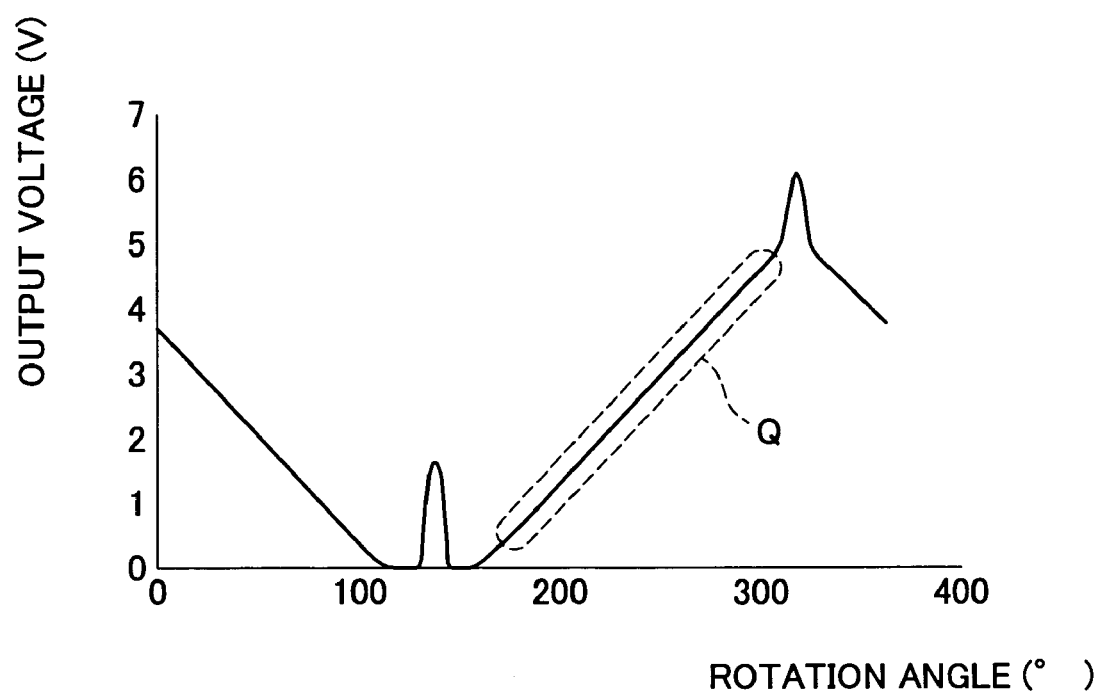
FIG. 18 is a drawing showing the phase shifting amount for each rotation angle of the rotor obtained by one of the amplifying units in the circuit block diagram shown in FIG. 17.

Accordingly, for example, the output voltage (V) of one of the exciting coils (coil B1) is obtained as shown in FIG. 18. As is clear from the relation between the rotation angle of the rotor relating to the exciting coil and the output voltage in the same drawing, peaks corresponding to the stay members 12a, 12b of the sensing unit 12 at two positions appear at the positions 180° apart from each other. Other than this point, a detection band Q in which an output voltage varies linearly in proportion to the rotation angle, and hence characteristic is improved appears in comparison with the rotation sensor relating to the invention.

Figure 19:
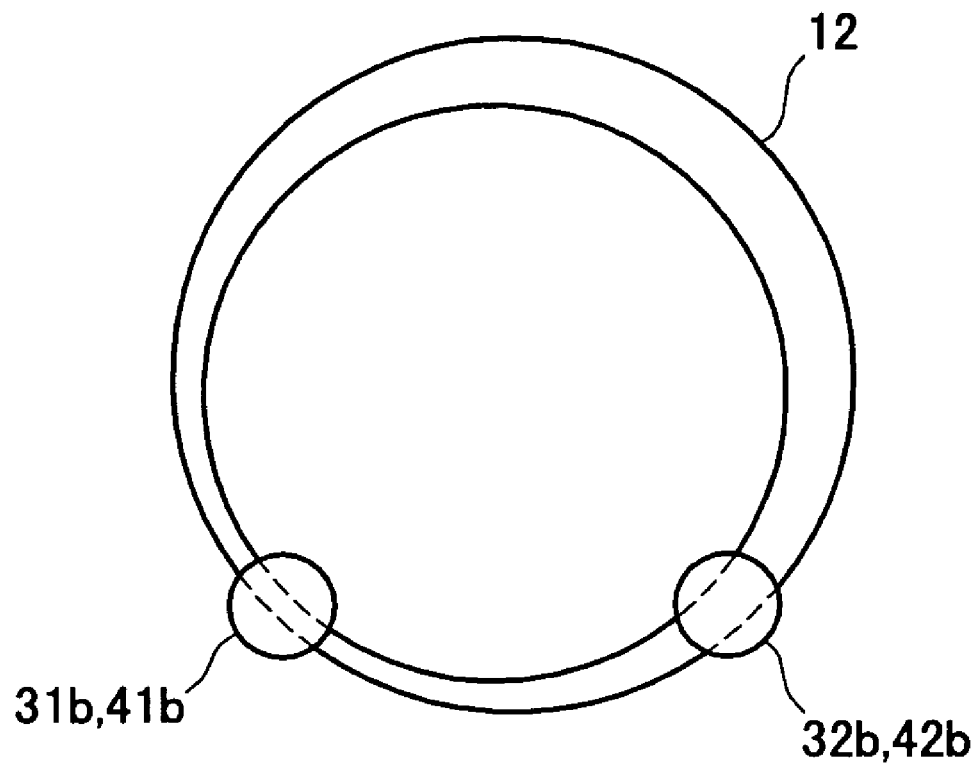
FIG. 19 is a plan view showing the positional relation between a rotor sensing unit of the rotation sensor and two exciting coils of the rotation sensor shown in FIG. 14.
Figure 20:
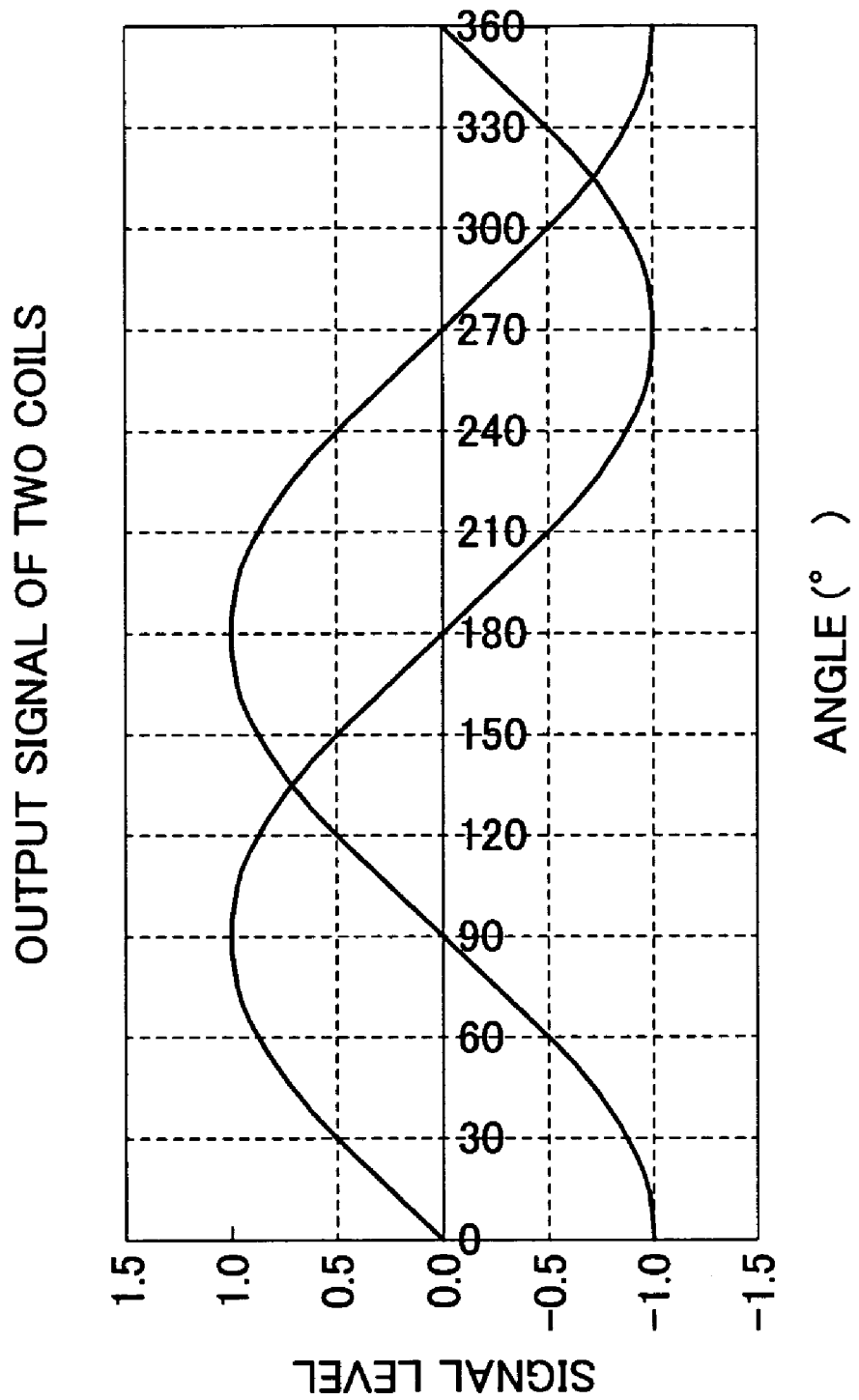
FIG. 20 is an output characteristic drawing corresponding to the phase shifting amount of the two exciting coils shown in FIG. 14.

Since the pair of the exciting coils 31b, 41b and the pair of the exciting coils 32b, 42b are disposed so as to form a center angle of 90° as shown in FIG. 19, the detection band Q according to the rotation angle of the rotor and being superior in linearity can be continuously generated alternatively in the range from 0° to 360° of the rotation angle of the rotor in a state of being displaced by a phase of 180° as shown in FIG. 20. In FIG. 20, the peaks are omitted.

Figure 21:
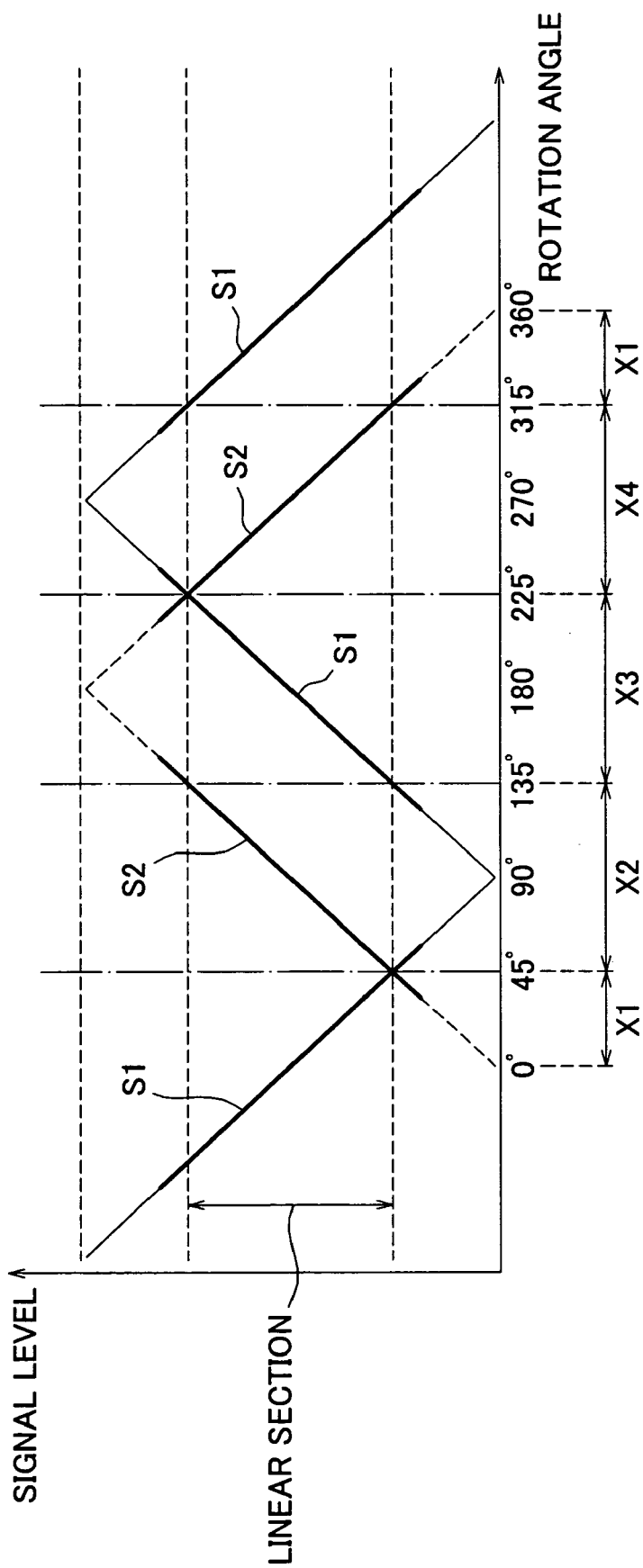
FIG. 21 is an output characteristic drawing corresponding to the phase shifting amount obtained by the both amplifying units in the circuit block diagram in FIG. 17 are superimposed at the signal processing unit.

As is clear from FIG. 20, there arises an area superior in linearity of the output signal corresponding to the phase shifting amount and an area not superior are generated according to variations in rotation angle of the rotor. FIG. 21 shows a characteristic drawing corresponding to a phase shifting amount, in which the area superior in linearity is shown by a thick line, and the area other than that is shown by a thin line in order to facilitate understanding of FIG. 20. The area superior in linearity is slightly larger than 90°. Then, in order to join the linear portions of the two coil output signals, it is necessary that the positions of the respective exciting coils are displaced by 90° in center angle like the rotation sensor according to the embodiment. In this manner, positioning of the coils at a center angle of 90° is the most convenient for determining the angular position of the rotor.

Subsequently, a method of determining the position of the rotor 10 in rotation angle will be described in detail. In the signal processing algorism, it is necessary to select (determine) two types of signals detected from the signal processing circuit as needed for detection in order to convert from the two coil detection signals to the rotation angle of 360° basis.

In other words, it is necessary to select the coil signal superior in linearity (the portion shown by the thick line in FIG. 21) within the signals S1 and S2, where S1 and S2 are signals corresponding to the detected phase shifting amounts of two exciting coils disposed at 90° of displacement from each other in center angle when the rotor 10 is at an arbitrary position.

In order to do so, it is necessary to determine the angular range. As shown in FIG. 20 and FIG. 21, one coil signal has a cycle of 180°, and hence has a binary property within the range of 360°. In other words, when the two coils are disposed at a rotation angle of 90°, the output signal level of the angle θ is equal to the output signal level of the angle (θ+180°). Therefore, determination whether the same signal level is the angle θ or the angle (θ+180°) is necessary. The specific method of determination will be shown below.

Firstly, the range of the linearity signal level is set. In other words, as shown in FIG. 21, the angular position is calculated using the signal within the range of the linearity area. More specifically;

In the case of the zone X1 (0°≦α<45°, 315°≦α<360°): the condition will be S1>S2, and the linearity of the S1 signal is superior. Therefore, the angular position of 0°≦α<45°, 315°≦α<360° are calculated using the S1 signal, In the case of the zone X2 (45°≦α<135°): the condition will be S2>S1, and hence the linearity of the S2 signal is superior. Therefore, the angular position of 45°≦α<135° is calculated using the S2 signal, In the case of the zone X3 (135°≦α<225°): the condition will be S2>S1, and hence the linearity of the S1 signal is superior. Therefore, the angular position of 135°≦α225° is calculated using the S1 signal, In the case of the zone X4 (225°≦α<315°): the condition will be S1>S2, and hence the linearity of the S2 signal is superior. Therefore, the angular position of 225°≦α<315° is calculated using the S2 signal.

Figure 22:
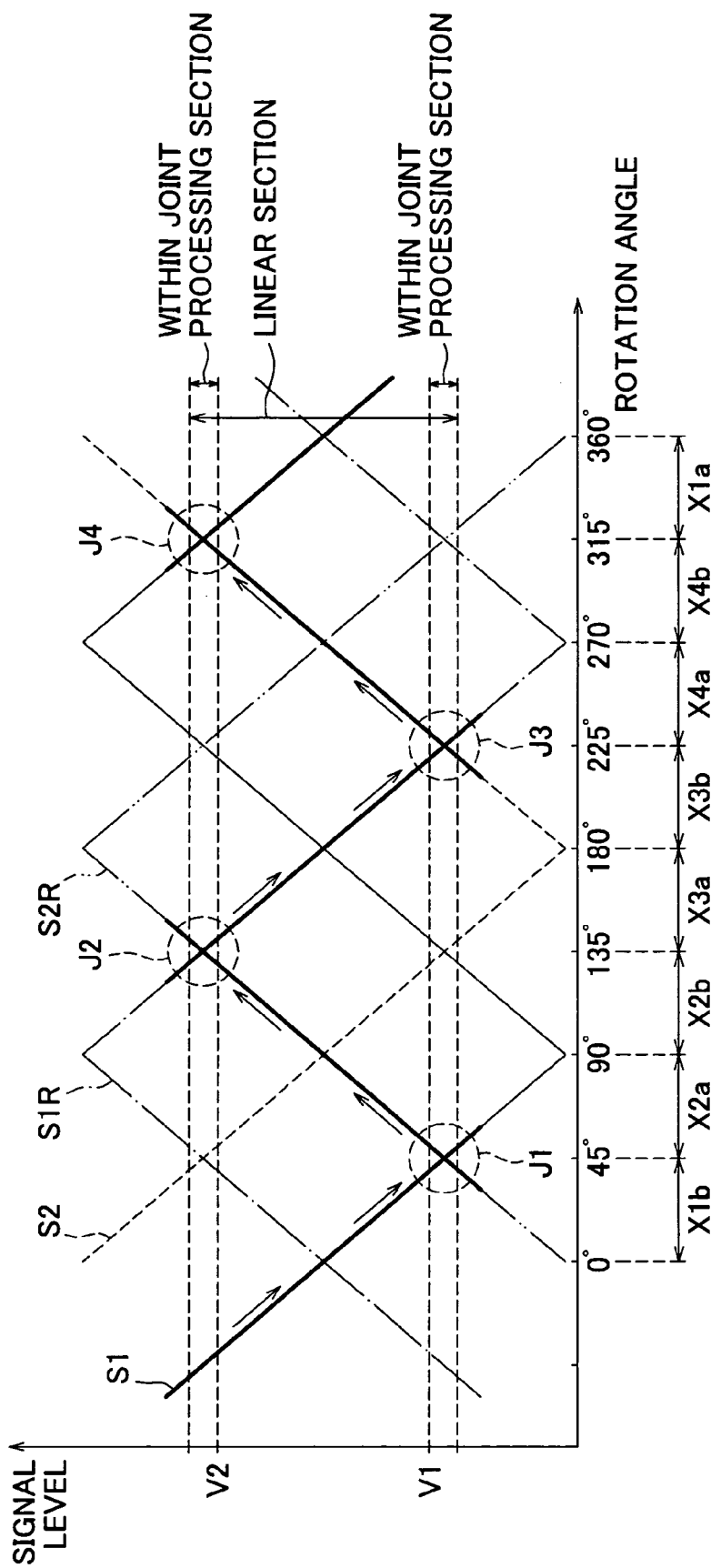
FIG. 22 is an output characteristic drawing showing a state in which the outputs corresponding to the reverse phase shifting amounts are further superimposed on the output characteristic drawing in FIG. 21.

The determination process as described above is performed only at the signal processing unit 160 shown in FIG. 17. More specifically, as shown in FIG. 22, in addition to the signals S1, S2 corresponding to the phase shifting amounts obtained by the phase shifting amount detecting units 130 of the respective exciting coils, reverse signals S1R, S2R corresponding to the phase shifting amounts which are obtained by reversing the phase shifting amounts are obtained, and based on these signals and reverse signals, the output signal which is the most superior in linearity is selected. FIG. 22 shows the signal S1R and a signal S2R which are obtained by reversing the output of the signal S1 and the signal S2 displaced by 180° in phase from each other in an overlapped manner.

Subsequently, in which rotational area the rotor 10 resides currently is determined from the size relation among the signal S1, the signal S2, the signal S1R, the signal S2R according to the rotation angle of the rotor 10 in the signal processing unit 160. More specifically, when the output of the phase shifting amount is S2R<S1<S1R<S2, it is determined to be 0°<rotation angle of the rotor<45° and hence the rotational position of the rotor is in a zone X1b. Also, when the output of the phase shifting amount is S1<S2R<S2<S1R, it is determined to be 45°<rotation angle of the rotor<90° and hence the rotational position of the rotor is in a zone X2a. When the output of the phase shirting amount is S1<S2<S2R<S1R, it is determined to be 90°<rotation angle of the rotor<135°, and hence the rotational position of the rotor is in a zone X2b. When the output of the phase shifting amount is S2<S1<S1R<S2R, it is determined to be 135°<rotation angle of the rotor<180°, and hence the rotational position of the rotor is in a zone X3a. When the output of the phase shifting amount is S2<S1R<S1<S2R, it is determined to be 180°<rotation angle of the rotor<225°, and hence the rotational position of the rotor is in a zone X3b. When the output of the phase shifting amount is S1R<S2<S2R<S1, it is determined to be 225°<rotation angle of the rotor<270°, and hence the rotational position of the rotor is in a zone X4a. When the output of the phase shifting amount is S1R<S2R<S2<S1, it is determined to be 270°<rotation angle of the rotor<315°, and hence the rotational position of the rotor is in a zone X4b. When the output of the phase shifting amount is S2R<S1R<S1<S2, it is determined to be 315°<rotation angle of the rotor<360°, and hence the rotational position of the rotor is in a zone X1a.

Figure 23:
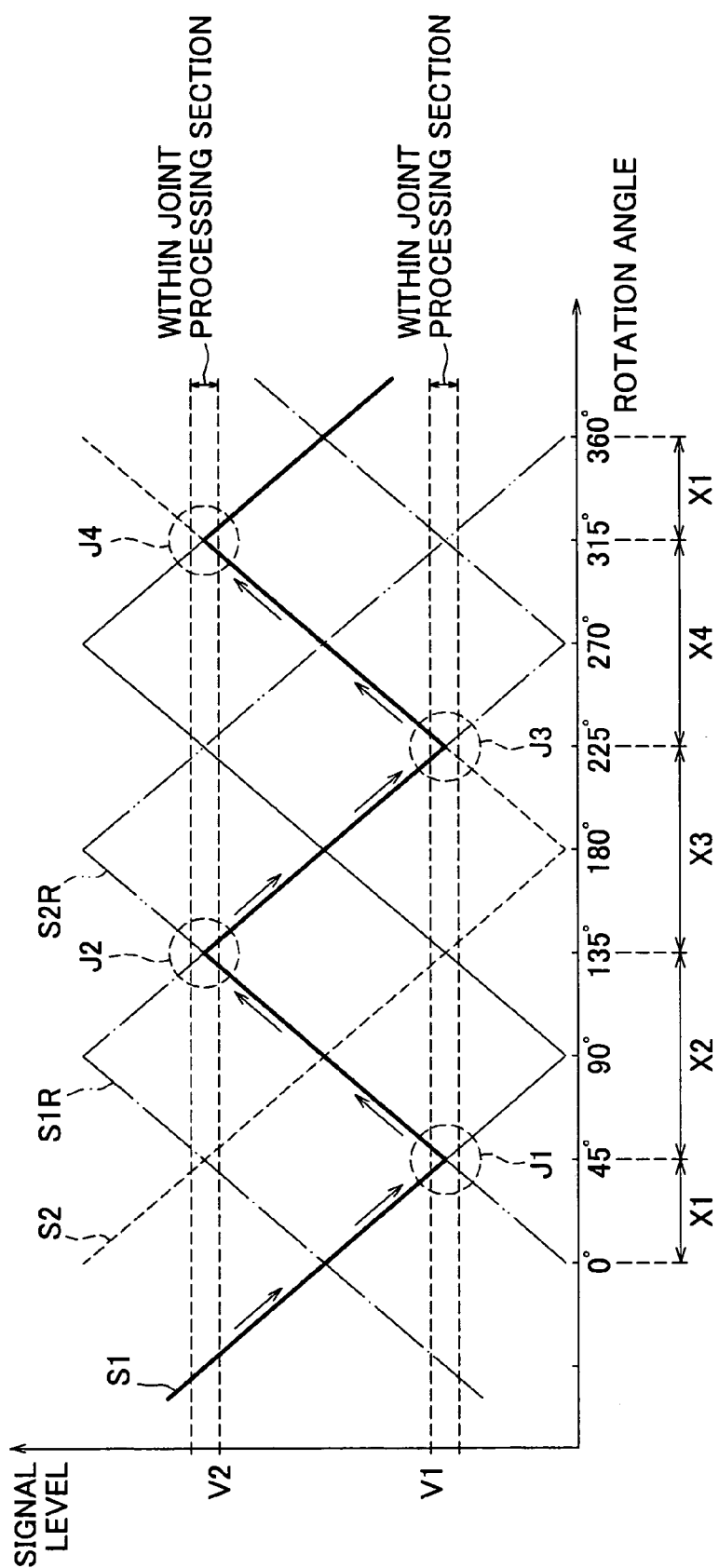
FIG. 23 is an output characteristic drawing showing a state in which a joint processing is applied to the output characteristic drawing in FIG. 22.

When detecting the rotation angle of the rotor 10, a processing to join the aforementioned four signal areas to form one continuous signal is also necessary. More specifically, it is necessary to connect the intersecting ends of the respective thick lines shown in FIG. 22 to each other so that the signal for detecting the rotation angle is formed into a connected thick line as shown in FIG. 23. The joint processing is required to disperse angular displacement calculated from the both coils to a certain angular range in order to control the error as small as possible. This is so called a smoothing process. Also, in order to disperse the angular displacement value as fine as possible, it is necessary to increase the angular range of the joint processing to a certain extent. Therefore, in the case of the rotation sensor according to this embodiment, another signal determination process is performed by the signal processing unit 160. In other words, in addition to the signal processing which detects the rotation angle of the rotor only from the signal S1 or the signal S2, the signal determination process for determining whether it is the normal signal calculating area or the joint processing section is performed. In order to facilitate the determination, as shown in FIG. 22, the reverse signals S1R and S2R of the signal S1 and the signal S2 generated by a microcomputer, which is the signal processing unit 160, are used also in the signal determination process.

For example, when determining a joint section J1 in the vicinity of 45° of the rotation angle of the rotor, if it is within the range in which there is a difference between the signal S1 and the signal S2R, it is determined that the rotation angle of the rotor enters into the joint processing section J1. Also, when determining a join section J2 in the vicinity of 135° of the rotation angle of the rotor, if it is within the range in which there is a difference between the signal S1R and the signal S2R, it is determined that the rotation angle of the rotor enters into the joint processing section J2. When determining a join section J3 in the vicinity of 225° of the rotation angle of the rotor, if it is within the range in which there is a difference between the signal S1R and the signal S2, it is determined that the rotation angle of the rotor enters into the joint processing section J3. When determining a join section J4 in the vicinity of 315° of the rotation angle of the rotor, if it is within the range in which there is a difference between the signal S2 and the signal S1, it is determined that the rotation angle of the rotor enters into the joint processing section J4. In this manner, the errors among the signals in the joint sections J1, J2, J3, J4 are controlled as small as possible, and the smoothing process for dispersing the angular displacement calculated form the both coils into a certain angular range is performed. Accordingly, as shown in FIG. 23, the joint processing in which the aforementioned four signal sections are joined to form a single continuous signal including S1, S2R, S1R, S2 is performed.

After having determined in which section the rotation angle of the rotor resides in this manner, if the rotation angle of the rotor is in the aforementioned zone X1, the linearity of the signal S1 is superior, and hence the rotation angle of the rotor 10 is detected from the signal S1. Also, when the rotation angle of the rotor 10 is within the aforementioned zone X2, the rotation angle of the rotor 10 is detected from the reverse signal S2R of the signal S2 which is superior in linearity. When the rotation angle of the rotor 10 is within the aforementioned zone X3, the rotation angle of the rotor is detected from the reverse signal S1R of the signal S1 which is superior in linearity. When the rotation angle of the rotor is within the aforementioned zone X4, since the linearity of the signal S2 is superior, the rotation angle of the rotor is detected form the signal S2.

In this manner, when detecting the rotation angle of the rotor, the rotation angle of the rotor can be detected over a wide range with high degree of accuracy even with a simple structure in which the exciting coils are provided on the two pairs of the stationary cores which are disposed so as to form a center angle of 90°.

In the first embodiment described above, the method of detecting the rotation angle of the rotor in the range of 0°≦rotation angle of the rotor<360° has been described. However, it is achieved in the same principle in the case of detection of the rotation angle of the rotor in the range of −360°≦rotation angle of the rotor<0°, as a matter of course.

The center angle between the two stationary cores with respect to the axis of the shaft is not necessarily required to be substantially 90° with respect to each other as in the case of the rotation sensor according to the first embodiment described above, and the effect of the invention can be achieved as long as they are disposed at two positions forming the center angle with respect to the axis of the shaft other than substantially 180°. However, since the output characteristic shown in FIG. 21 to FIG. 23 can be obtained by disposing the two stationary cores at positions forming the center angle of substantially 90° to each other with respect to the axis of the shaft, it can be said that such arrangement of the stationary cores is the most preferably to detect the rotation angle by the small number of stationary cores with high degree of accuracy.

The stationary cores is not necessarily disposed as the pair of stationary cores opposed to each other with the intermediary of the sensing unit of the rotor as in the rotation sensor according to the aforementioned embodiment. However, by disposing the respective stationary cores so as to oppose to each other with the intermediary of the sensing unit of the rotor, the respective pairs of the stationary cores can cancel out variations in output characteristic with respect to variations, whereby the rotation angle detection with superior vibration resistance can be done. Therefore, it can be said that opposing arrangement of the respective stationary cores with the intermediary of the sensing unit of the rotor is preferable arrangement.

In other words, according to the first embodiment, the rotation sensor which is superior in assembleability and can achieve cost reduction, and which is superior in detection accuracy over a wide range of the rotation angle is provided.

Subsequently, a rotation sensor 201 according to a second embodiment of the invention will be described.

Figure 24:
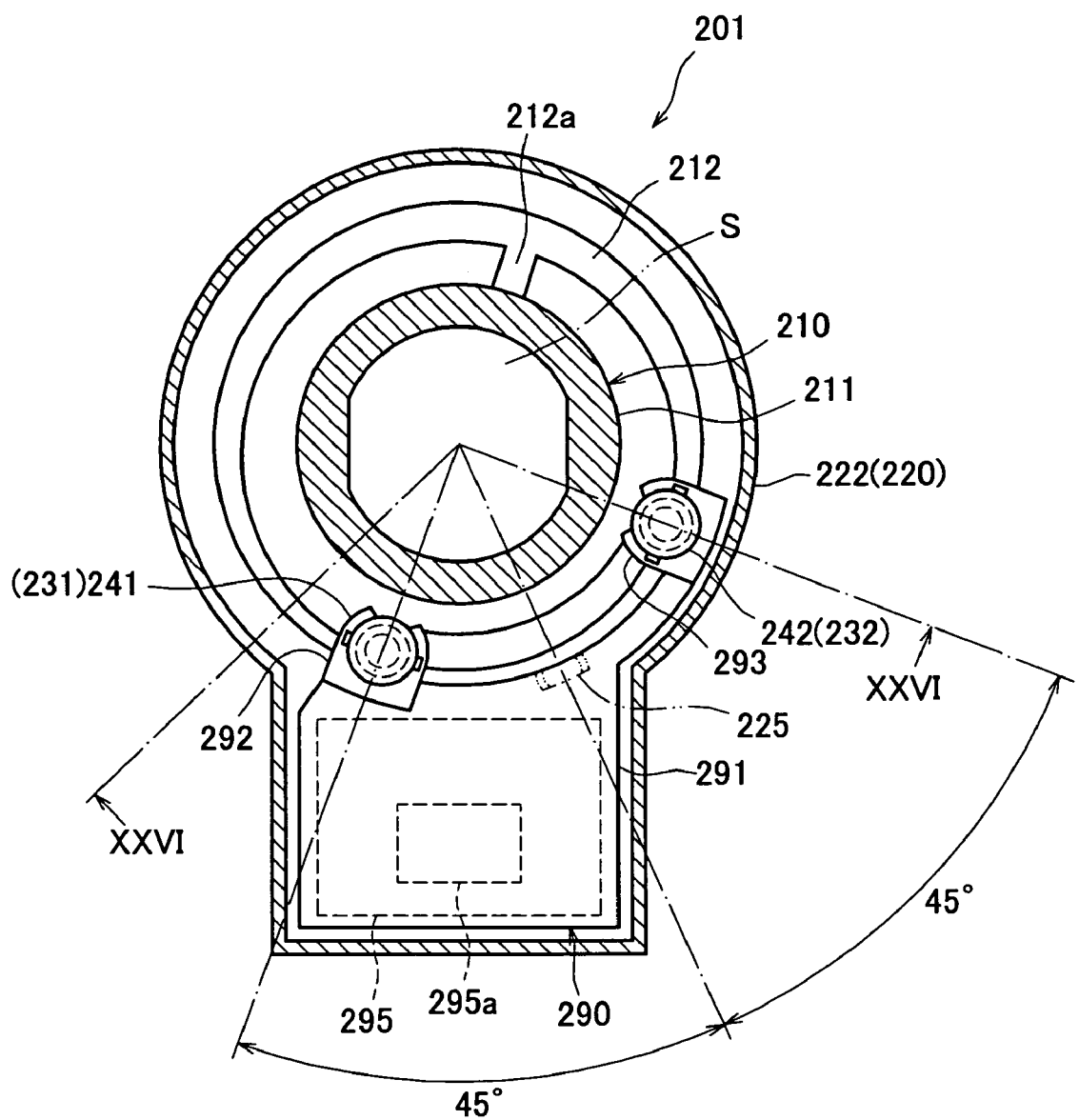
FIG. 24 is a plan view showing an internal structure of the rotation sensor according to a second embodiment of the invention.
Figure 26:
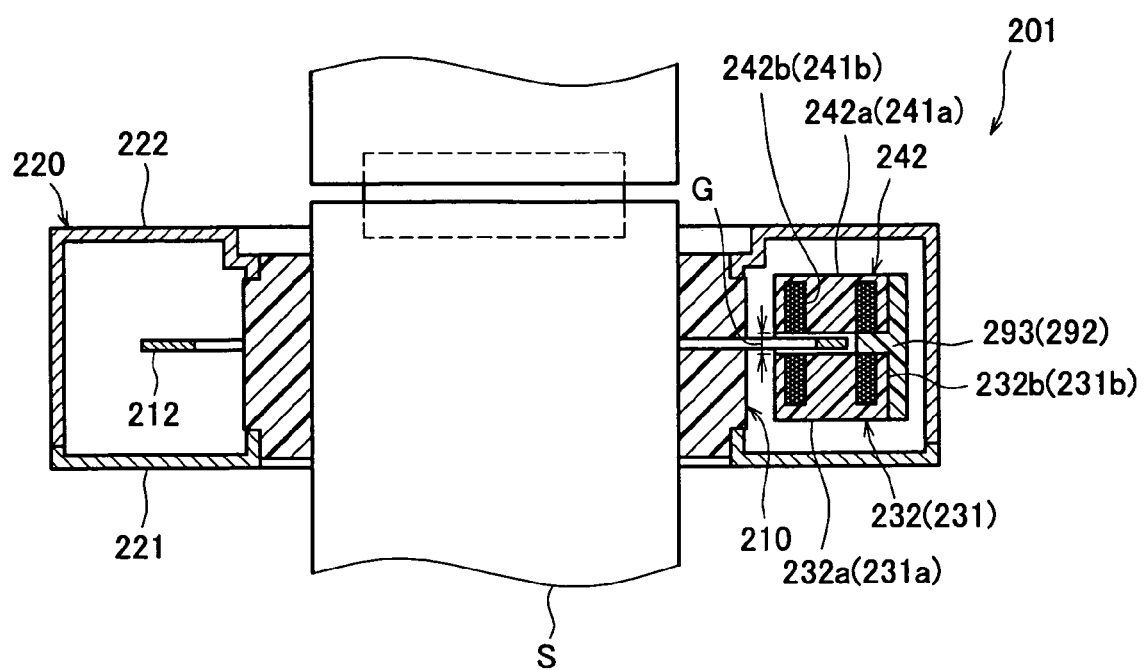
FIG. 26 is a cross-sectional view of the rotation sensor taken along the line XXVI—XXVI shown in a state in which the rotation sensor shown in FIG. 24 is mounted to a shaft.

As shown in FIG. 24 and FIG. 26, the rotation sensor 201 according to the second embodiment of the invention includes a rotor 210 to be mounted to the rotating shaft S, stationary cores 231, 232 (241, 242) each having a core body formed of insulative magnetic material and at least one exciting coil to be accommodated in the core body, a retaining member (stator) 290 for retaining the stationary cores 231, 232 (241, 242), a circuit board 295 provided on part of the retaining member 290, and a case 220 for accommodating these members. The rotation sensor 201 is adapted to be mounted to a vehicle by fitting the rotor 210 to the shaft S and mounting the case 220 to a sensor mounting member 300 shown in FIG. 11.

Figure 9:
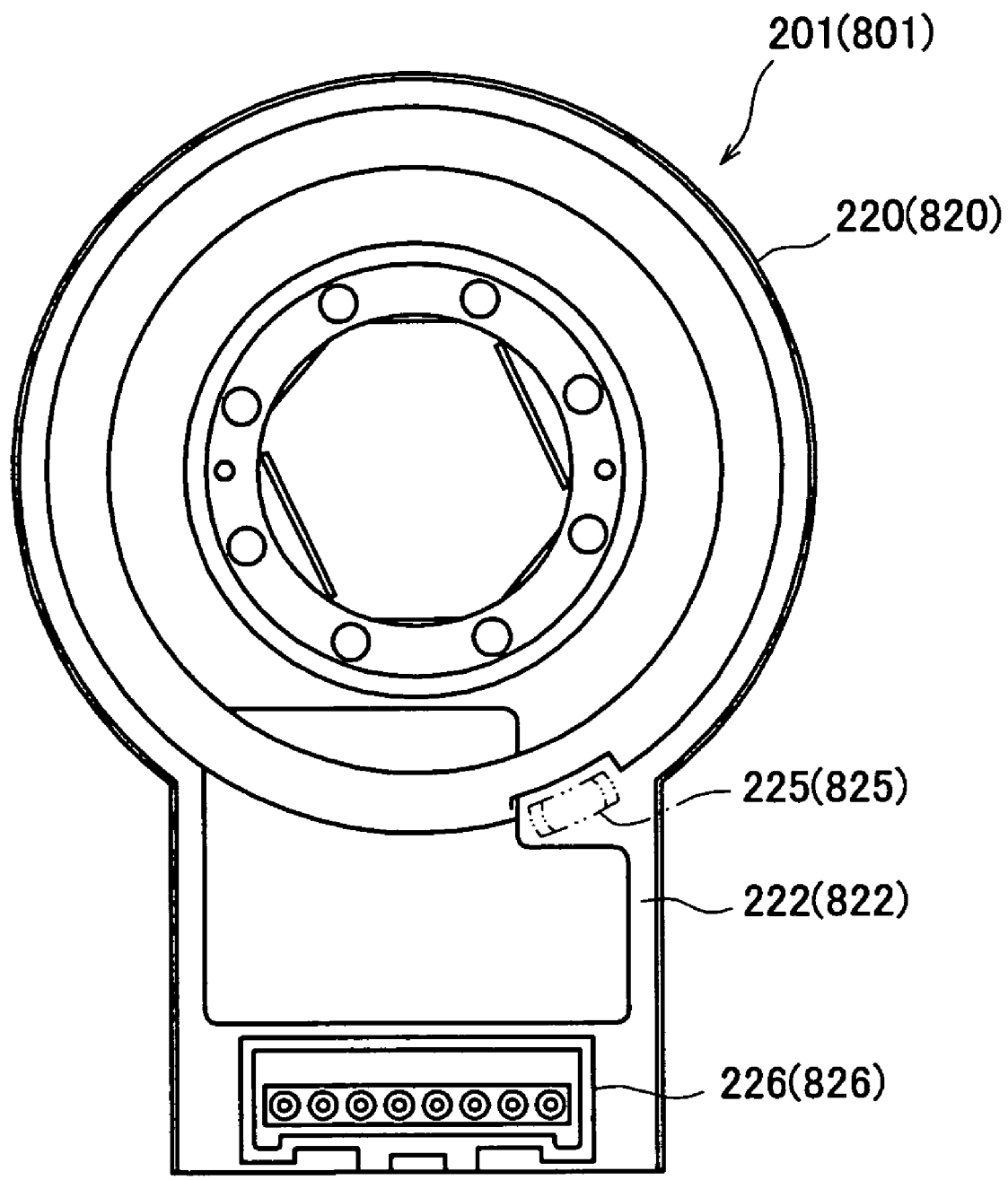
FIG. 9 is a plan view of an embodiment of the invention shown in FIG. 24, and the rotation sensor relating to the invention shown in FIG. 1.
Figure 10:
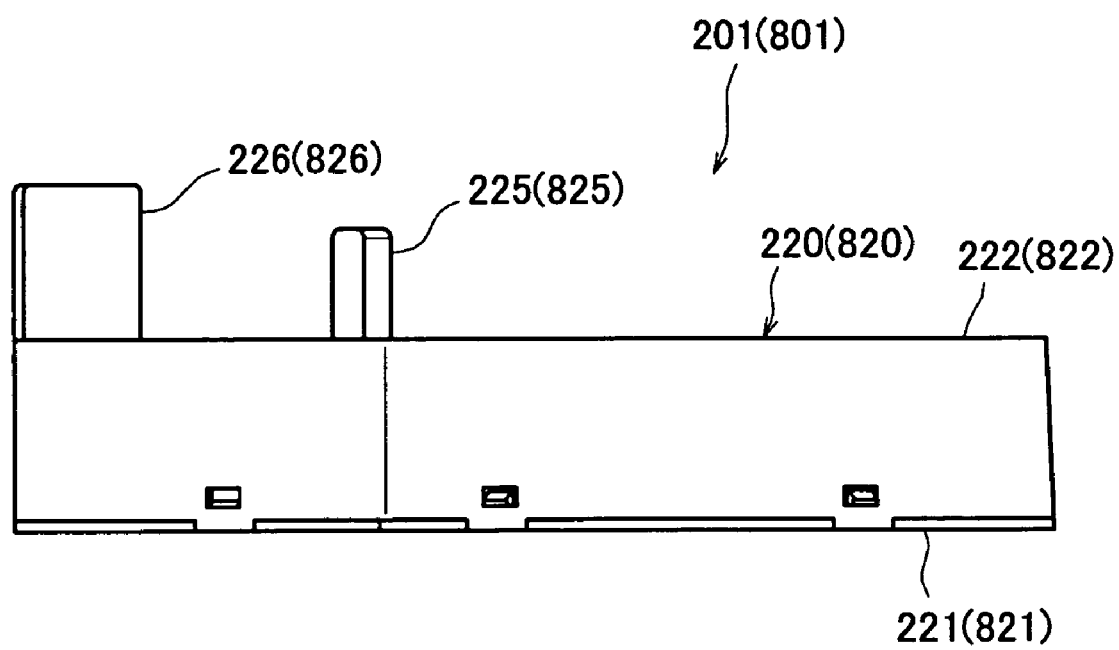
FIG. 10 is a side view of the rotation sensor shown in FIG. 9.

The retaining member 290 is provided with the stationary cores 231, 232 (241, 242), a circuit board 295 provided with a rotation angle detecting unit 295*a*, and the rotor 210 are accommodated in the case 220 formed of metal or insulative magnetic material having a property for shielding the alternating magnetic field. As shown in FIG. 26, the case 220 includes an upper case 221 and a lower case 222, and is mounted to the vehicle via the rotation sensor mounting member 300 located near the shaft S, a bracket, not shown, and the like. The outer periphery of the lower case 222 is fitted to a mounting rib 303 of the sensor mounting member 300, described later, and as shown in FIG. 9 and FIG. 10, an engagement projection (mounting engagement portion) 225 formed on the lower case 222 engages with an engaging notch 305 of the sensor mounting member 300, so that the rotation sensor 201 can be mounted to the sensor mounting member 300. The engagement projection 225 for mounting the rotation sensor 201 to the sensor mounting member 300 is formed on the lower case 222 so as to project at a predetermined position in the circumferential direction of the sensor shifted slightly rightward when viewed in the longitudinal direction shown in FIG. 9.

The lower case 222 is formed with a connector unit 226 for electrically connecting the rotation angle detecting unit 295a of the rotation sensor 201 and the external wire harness so as to project therefrom (see FIG. 9 and FIG. 10).

Figure 25:
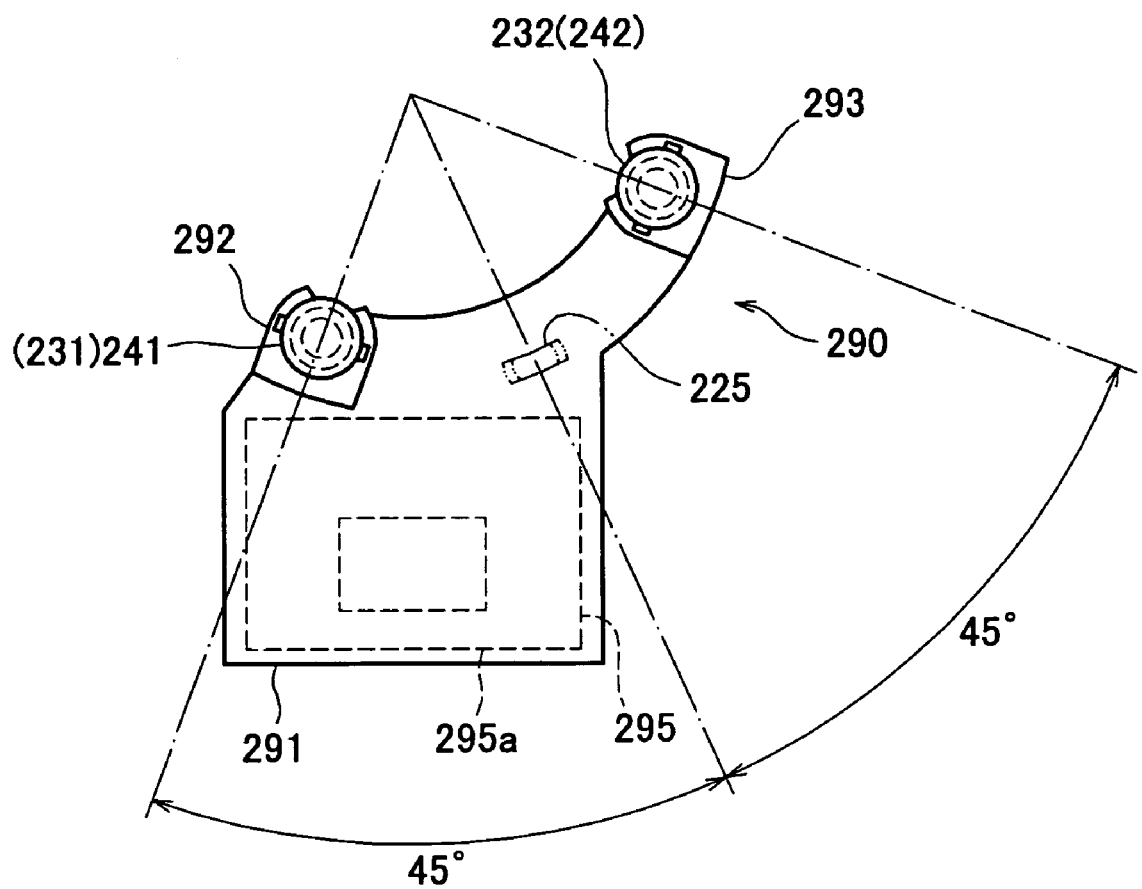
FIG. 25 is a plan view showing only a coil holder, a stationary core, and a circuit board of the rotation sensor shown in FIG. 24.

On the other hand, as shown in FIG. 25, the retaining member 290 is a deformed square plate member whereof only one end is bent and extended formed, for example, of synthetic resin (for example, polybutylene terephthalate (PBT), nylon, polyphenylene sulfide (PPS), acrylonitrile-butadiene-styrene (ABS) resin , or fiber reinforced plastic (FRP) which is glass fiber impregnated with epoxy resin, and includes a base portion 291 to be mounted to the lower case 222 and coil core holders 292, 293 provided at one side end of the base portion 291.

Then the coil core holder 292 is adapted to arrange the stationary cores 231, 241 so as to oppose to each other and the coil core holder 293 is adapted to arrange the stationary cores 232, 242 so as to oppose to each other. In other wards, the coil core holder 292 of the retaining member 290 is provided with the stationary cores 231, 241 opposed to each other while keeping the concentricity thereof as shown in FIG. 26, and the other coil core holder 293 of the retaining member 290 is provided with the stationary cores 232, 242 opposed to each other while keeping the concentricity thereof. Accordingly, the stationary core 231 (232) on one side is opposed to the other stationary core 241 (242) with the intermediary of a sensing unit 212 at a predetermined distance G (see FIG. 26). In other words, the stationary core 231 and the stationary core 241 are opposed to each other with the intermediary of the sensing unit 212 of the rotor 210 while keeping the concentricity, while the stationary core 232 and the stationary core 242 are also opposed to each other with the intermediary of the sensing unit 212 of the rotor 210 while keeping the concentricity.

As shown in FIG. 24 and FIG. 25, in the retaining member 290, the coil core holders 292, 293 are disposed at a center angle of 90° with respect to the axis of the shaft S, and the stationary core 231 (241) and the other stationary core 232 (242) are arranged at symmetrical positions with respect to the connecting line (mounting reference line) connecting the center axis of the shaft S (shaft portion) and the engagement projection 225.

On the other hand, part of the retaining member 290 is provided with the circuit board 295, and the rotation angle detecting unit 295a is mounted to the circuit board 295. The rotation angle detecting unit 295a is connected to or the wire harness for supplying to the power source and transmitting the signal via a plurality of electric cables (not shown) extended out from the case 220, and is connected to the external device provided outside of the case 220.

As shown in FIG. 26, the stationary cores 231, 232 on one side, being formed of insulative magnetic material (for example, Ni—Zn ferrite, Mn—Zn ferrite, or Mg—Zn ferrite mixed with thermoplastic synthetic resin having electrical insulating property such as nylon, polypropylene (PP), polyphenylene sulfide (PPS), or acrylonitrile-butadiene-styrene (ABS) resin, or ceramic), and formed into a column-shape, and include core bodies 231a, 232a each having a ring-shaped void for accommodating an exciting coil on the upper surface side and exciting coils 231b, 232b so as to be accommodated in the core bodies 231a, 232a. Likewise, the other stationary cores 241, 242 include core bodies 241a, 242a formed of insulative magnetic material and exciting coils 241b, 242b accommodated in the core bodies 241a, 242a. Then, the exciting coils 231b, 232b and the exciting coils 241b, 242b are connected in series respectively, and are electrically connected to the rotation angle detecting unit 295a of the retaining member 290, thereby forming an alternating magnetic field around the coils by being flowed with the AC exciting current, and forming a magnetic circuit between the respective pairs of stationary cores.

As shown in FIG. 24, the rotor 210 includes a rotor mounting portion 211 formed of insulative magnetic material and a sensing unit 212 connected to the rotor mounting portion 211 via stay members 212a, 212b and being continuously changed in width in the circumferential direction. The sensing unit 212 is formed of metal having conductivity such as aluminum, copper, silver, or brass. As shown in the same drawing, the sensing unit 212 includes a narrow portion which has the narrowest width and a widened portion which has the widest portion on the radially opposite side thereof. Then, it is formed so as to vary in radial width corresponding to the rotation angle of the rotor 210, so that an eddy current having a magnitude based on the surface area corresponding to the respective coils and the width of sensing unit is induced by the alternating magnetic field, described later, in association with the rotation of the rotor.

In other words, when the AC exciting current is flowed through the respective exciting coils 231b, 232b, 241b, 242b, the respective exciting coils 231b, 232b, 241b, 242b generates an alternating magnetic field in the periphery thereof, and the opposing core body 231a and the core body 241a establish a magnetic circuit in cooperation with each other. Likewise, the opposing core body 232a and the core body 242a establish the magnetic circuit in cooperation with each other. When the magnetic flux crosses the sensing unit 212, an eddy current is induced on the surface of the sensing unit 212, whereby the impedances of the respective exciting coils 231b, 232b, 241b, 242b are varied. The amount of variation of the impedance corresponds to variations in the amount of eddy current induced on the surface of the sensing unit 212. The amount of eddy current induced on the surface of the sensing unit 212 varies depending on the surface area of the sensing unit 212 corresponding to the stationary cores 231, 232, 241, 242 (the projecting area with respect to the stationary core of the sensing unit when viewed from the direction orthogonal to the sensing surface of the sensing unit 212, that is, "the projecting area on the stationary core of the sensing unit"). Therefore, when the rotor 210 rotates, the width of the sensing unit 212 corresponding to the respective stationary cores 231, 232, 241, 242 varies in proportion with the rotation angle of the rotor 210, and accordingly, the impedances in the respective exciting coils 231b, 232b, 241b, 242b vary. The output signals from the respective exciting coils 231b, 232b, 241b, 242b at this time are detected by the rotation angle detecting unit 295a, described later, and converted into the angle signal of the rotor 210, so that the rotation angle of the rotor 210 can be detected.

Although not shown here, the rotation angle detecting unit 295a includes a phase shifting unit, a phase shifting amount detecting unit, and a converter connected between the frequency dividing circuit and the measuring unit.

Also, the converter is connected to the A/D converter via a differential amplifier and is connected to the shift level adjusting unit. More specifically, the change of the coil impedance is converted into the angle and detected via the frequency dividing circuit for outputting an oscillation signal of a specified frequency, the phase shifting unit for shifting the phase of the oscillation signal supplied from the frequency dividing circuit according to the magnitude of the eddy current generated at the sensing unit, the phase shifting amount detecting unit for detecting the phase shifting amount, the converter for converting the detected phase shifting amount to the corresponding voltage value, the amplifying circuit for amplifying the voltage corresponding to the phase shifting amount outputted from the converter, and the measuring unit for measuring the rotation angle from the amplified voltage.

The rotation sensor 201 having the structure as described above is adapted to detect over the entire rotation angle ranging from 0° to 360° by performing the signal processing on the output by the rotation angle detecting unit 295a by utilizing variations in impedances of the exciting coils 231b, 232b (241b, 242b) caused by the rotation of the shaft S.

Figure 11:
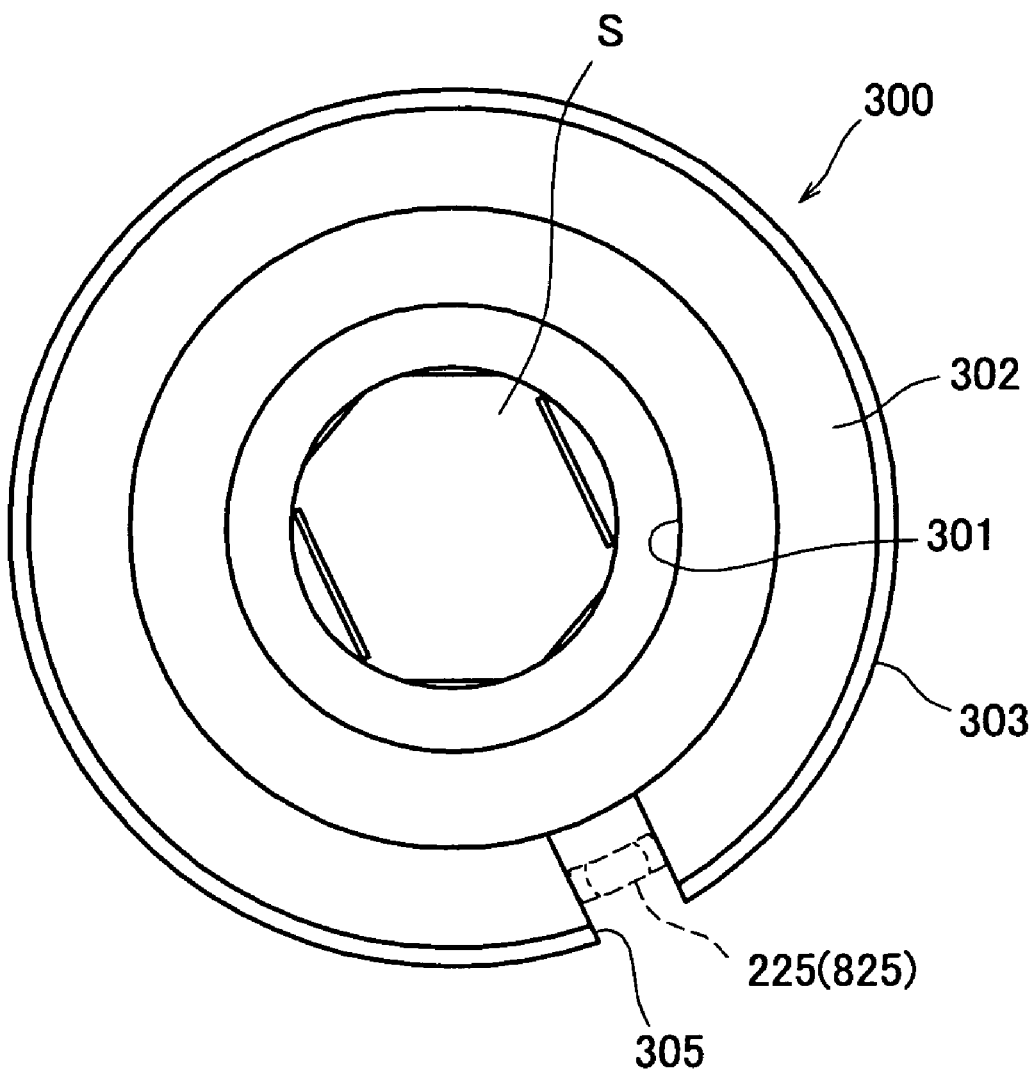
FIG. 11 is a plan view of the mounting member to which the rotation sensor according to this embodiment and the rotation sensor relating to the invention are mounted.

On the other hand, the sensor mounting member 300 to which the rotation sensor 201 is mounted has the same structure as the sensor mounting member 300 described in the related art of the invention. In other words, as shown in FIG. 11, the sensor mounting member 300 includes a shaft insertion hole 301 for inserting the shaft S at the center thereof, and an abutting portion 302 which abuts against the lower case 222 of the rotation sensor 201 on the outer periphery thereof, and the rotation sensor retaining rib 303 is formed on the outer periphery of the abutted portion 302. Part of the abutting portion 302 and the retaining rib 303 is formed with an engagement notch (engagement recess) 305, so as to engage with the engagement projection 225 (see FIG. 9 and FIG. 10) provided on the rotation sensor 201. The sensor mounting member 300 is provided with a bracket, not shown, for fixing the same to the vehicle, so that the sensor mounting member 300 is mounted to the vehicle in advance.

The rotation sensor 201 is mounted to the sensor mounting member 300 by passing the shaft S through the center portion of the rotation sensor 201 and fitting the outer periphery of the case of the rotation sensor 201 to the retaining rib 303 of the sensor mounting member 300 while engaging the engagement projection 225 of the rotation sensor 201 with the engagement notch 305 of the sensor mounting member 300.

When mounting the rotation sensor 201 to the sensor mounting member 300, in order to improve the detecting characteristic of the rotation sensor 201 the engagement projection 225 of the rotation sensor 201 and the engagement notch 305 of the sensor mounting member 300 are formed so that the rotation sensor 201 is mounted so as not to rattle in the circumferential direction in a state of being mounted and simultaneously so as to generate rattling to a certain extent in the radial direction in a state of being mounted in order to facilitate mounting of the rotation sensor 201 to the sensor mounting member 300.

Accordingly, the sensing unit 212, which is the rotor side of the rotation sensor 201, is rotatably fixed together with the shaft S, and the stationary cores 231, 232, 241, 242 on the stator side of the rotation sensor 201 are mounted to the sensor mounting member 300 with restrained in the circumferential direction of the sensor and with rattling in the radial direction of the sensor to a certain extent.

As described above, the stationary cores 231, 232 form a center angle of 90° with respect to the axis of the shaft S, and are disposed on the lower case side of the retaining member 290 symmetrically with respect to the connecting line connecting the center axis of the shaft S and the engagement projection 225 of the case 220. On the other hand, the stationary cores 241, 242 form a center angle of 90° with respect to the axis of the shaft S, and are disposed on the upper case side of the retaining member 290 symmetrically with respect to the connecting line connecting the center axis of the shaft S and the engagement projection 225 of the case 220.

Subsequently, the operation of the rotation sensor according to the second embodiment of the invention having the structure as described above will be described. As described above, the dimensions of the engagement projection 225 of the case 220 and the engagement notch 305 of the sensor mounting member 300 are determined so as to rattle very little in the direction of rotation of the sensor (direction θ), while a certain gap is provided in the direction vertical to the direction of the rotation of the sensor (direction r) so as to facilitate mounting of the rotation sensor 201. Then, the rotation sensor 201 is fixed so as not to rotate in circumferentially of the sensor by the engagement of the engagement projection 225 with respect to the engagement notch 305 of the mounting side. Since the rotor 210 of the rotation sensor 201 is mounted to the shaft S in this manner, the sensing unit 212 of the rotation sensor 201 is restrained by the shaft S in the radial direction of the sensor.

On the other hand, the coil core holders 292, 293 and the stationary cores 231, 232, 241, 242 provided thereto are not fixed to the shaft S, and are shifted in the radial direction of the sensor within the predetermined range of rattling between the engagement projection 225 of the rotation sensor 201 and the engagement notch 305 of the sensor mounting member 300.

Figure 12:
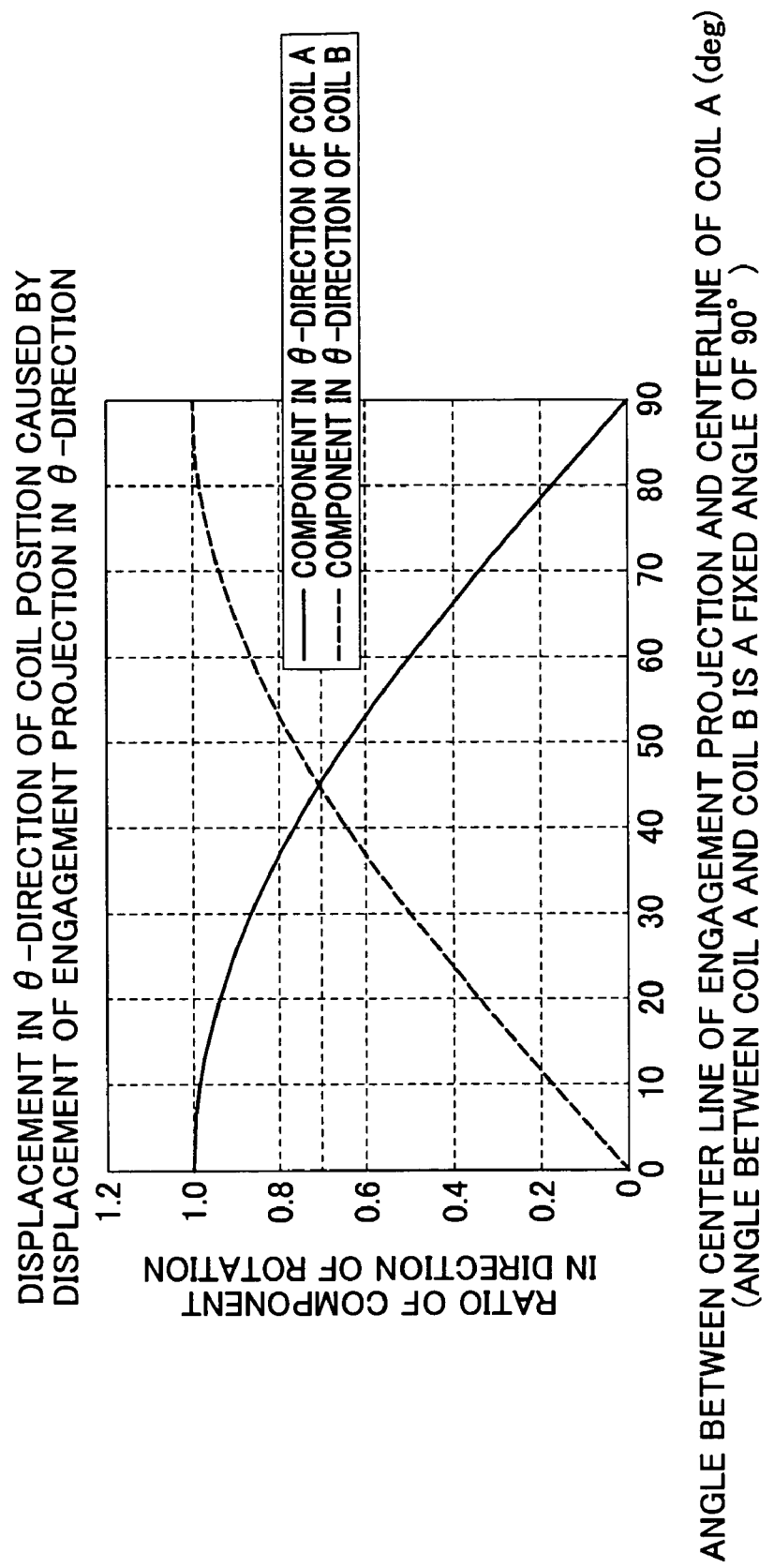
FIG. 12 is a drawing showing a radial displacement with respect to a mounting reference line of the rotation sensor and the ratio of the component in the rotational direction caused thereby.
Figure 13:
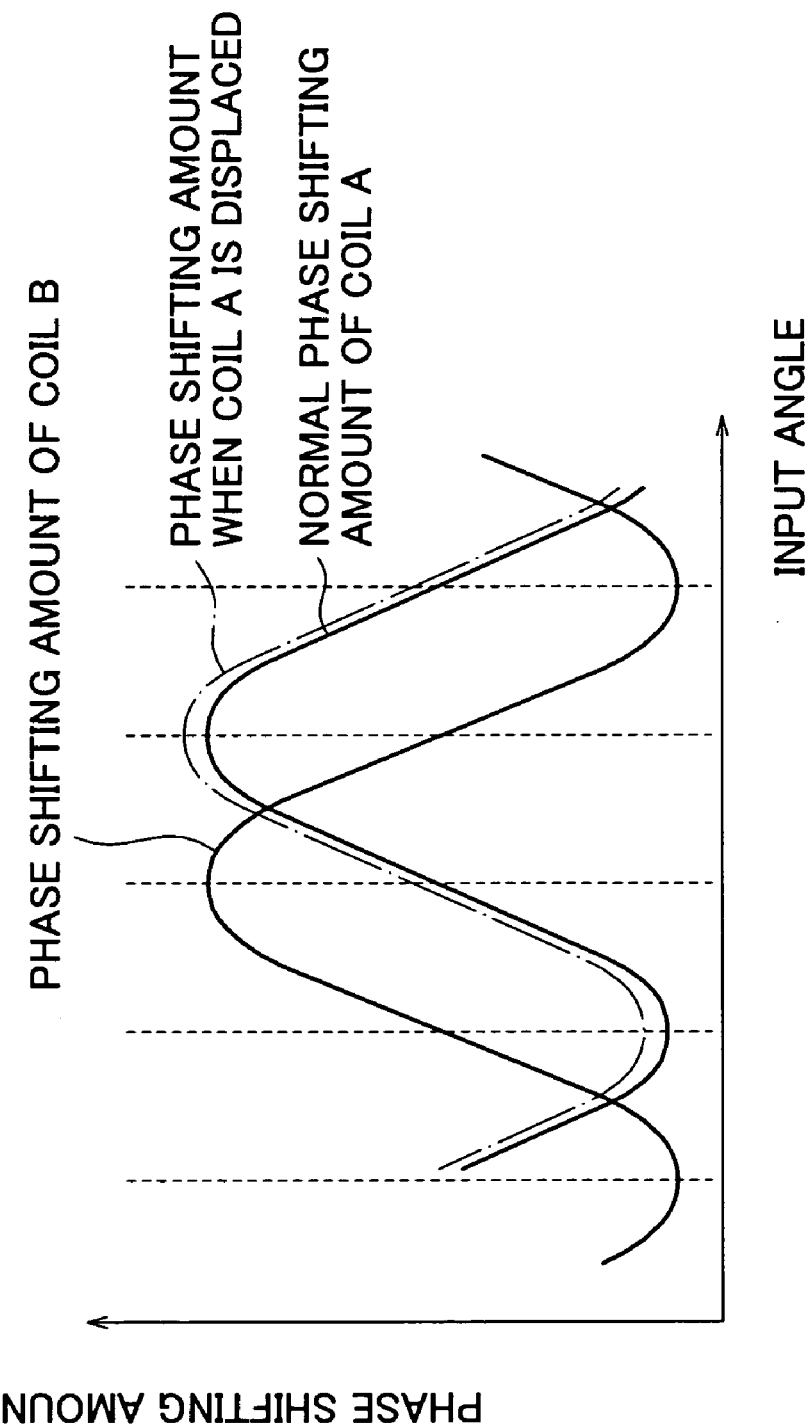
FIG. 13 is a detection characteristic drawing showing a state in which the phase shifting amount of one of the exciting coils is displaced when the coil cores are disposed to form a center angle of 90°.

However, the stationary cores 231, 232, 241, 242 are fixed to the case 220 of the rotation sensor 201 at a center angle of 45° with respect to the connecting line (mounting reference line) so as to be symmetrical with respect to the aforementioned connecting line (mounting reference line). In this arrangement, as will be seen from the characteristic drawing shown in FIG. 12, the ratio of circumferential components of the rotation sensor, which may be reduced by rattling of the rotation sensor in the radial direction, is about 71%, and it is understood that there is only small extent of reduction.

In other words, with the rattling of the rotation sensor in the radial direction, the degree of influence on the one of the stationary core in the circumferential direction is not obviously increased unlike with the rotation sensor relating to the invention. Accordingly, by mounting the rotation sensor 201 to the sensor mounting member 300 and making the rotation sensor 201 displaced in the radial direction with respect to the sensor mounting member 300, even when the stationary cores 231, 232, 241, 242 are displaced in the radial direction with respect to the sensing unit 212 of the rotor 210, the detection accuracy of the rotation angle is not significantly reduced. Therefore, the rattling required for mounting the rotation sensor 201 can be secured in the radial direction of the rotation sensor 201 to a certain extent, and hence improvement of mountability of the rotation sensor is achieved, and high degree of detection accuracy can be maintained.

In the above-described second embodiment, the stationary core 231 (241) and the stationary core 232 (242) are disposed only at tow position at a rotation angle of 90° from each other. By arranging the stationary cores 231 (241), 232

(242) of the rotation sensor 201 only at two positions circumferentially of the sensor, cost reduction of the rotation sensor 201 is achieved.

Since the stationary cores 231, 241 (232, 242) are composed of two pairs of stationary cores disposed so as to oppose to each other with the intermediary of the sensing units respectively, even when the shaft (shaft portion) S to which the rotation sensor 201 is mounted vibrates, the impedance of the stationary cores of each pair opposed to each other is cancelled out, and hence the adverse effect of vibrations may be reduced.

When the number of the stationary cores is odd number, other stationary cores other than the stationary core disposed on the axial line may be disposed symmetrically with respect to the axial line.

In the above-described second embodiment, the engagement projection 225 is provided on the case side of the rotation sensor 201, and the engagement notch (recess) 305 is provided on the sensor mounting member 300. However, the invention is not limited thereto, and the structure in which the engagement notch (recess) is formed on the case of the rotation sensor 201, and the engagement projection is provided on the sensor mounting member is also applicable.

In other words, according to the second embodiment, mounting operation to the partner side can be performed easily, and the rotation sensor superior in detection accuracy is provided.

Subsequently, the rotation sensor according to a third embodiment will be described.

The rotation sensor according to the third embodiment of the invention has the same structure as the rotation sensor shown in FIG. 14 except for a method of signal processing.

Figure 27:
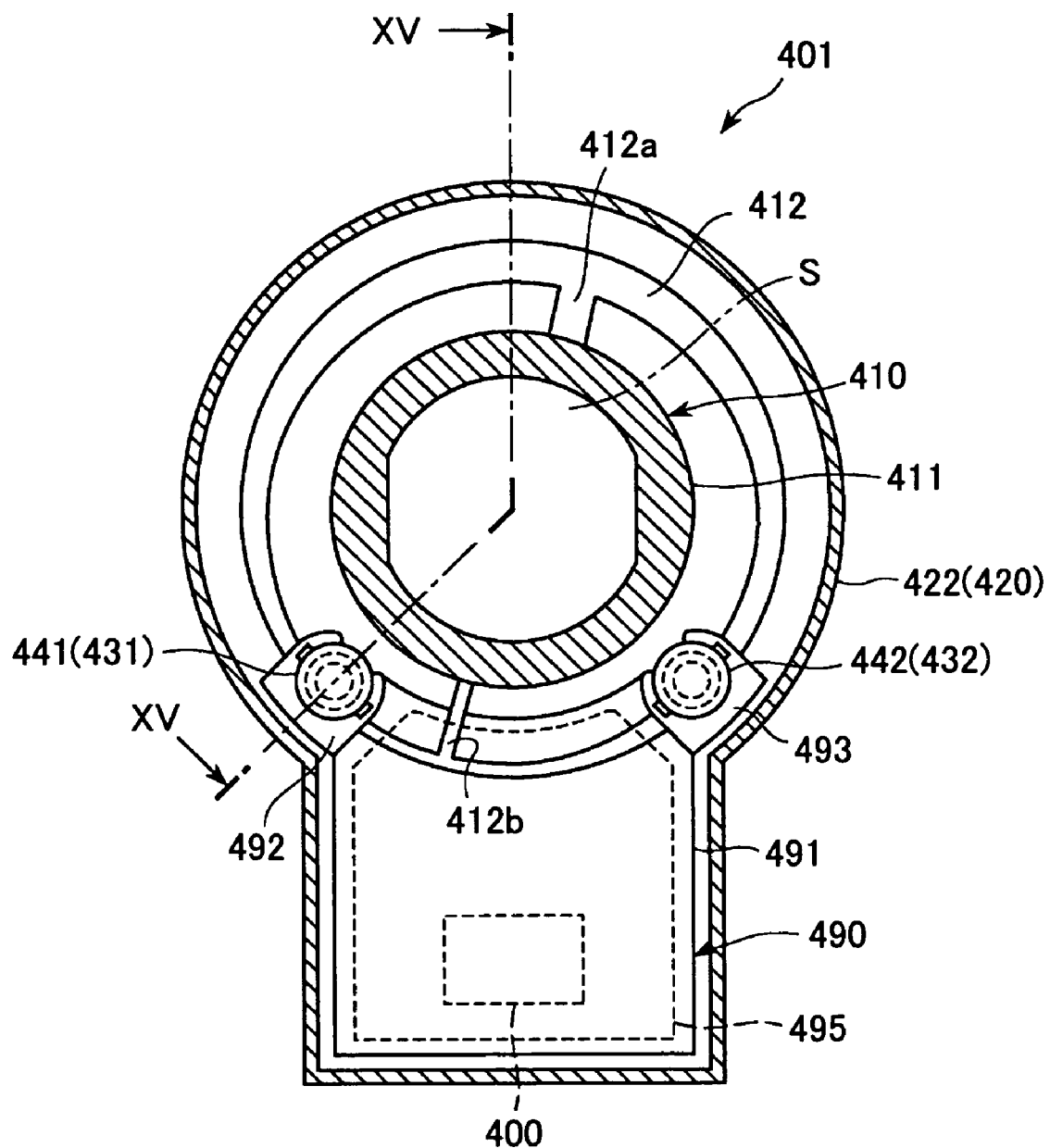
FIG. 27 is a plan view showing an internal structure of the rotation sensor according to a third embodiment of the invention.

More specifically, as shown in FIG. 27, the rotation sensor 401 according to the third embodiment of the invention includes a rotor 410 to be mounted to the rotating shaft S, stationary cores 431, 432 (441, 442) each having a core body formed of insulative magnetic material and at least one exciting coil to be accommodated in the core body, a retaining member 490 for retaining the stationary cores 431, 432 (441, 442), a circuit board 495 provided on part of the retaining elements 490, and a case 420 for accommodating these members. The retaining member 490 is provided with a coil core holder 492 for opposing the stationary cores 431, 441 at a predetermined distance, and a coil core holder 493 for opposing the stationary cores 432, 442 at a predetermined distance. Then, as shown in FIG. 27, the coil core holders 492, 493 are assembled to the retaining member 490 of the rotation sensor 401 so as to form a center angle of 90° with respect to the axis of the shaft S. Accordingly, the respective stationary cores 431, 441 on one pair are disposed so as to form a center angle of 90° from the stationary cores 432, 442 on the other pair with respect to the axis of the shaft S. Then, the stationary cores 431, 432 are disposed on the lower case side of the retaining member 490 so as to form a center angle of 90° with respect to the axis of the shaft S as described above. On the other hand, the stationary cores 441, 442 are disposed on the upper case 421 side of the retaining member 490 so as to form a center angle of 90° with respect to the axis of the shaft S.

The stationary cores 431, 432 on one side, being formed of insulative magnetic material (for example, Ni—Zn ferrite, Mn—Zn ferrite, or Mg—Zn ferrite mixed with thermoplastic synthetic resin having electrical insulating property such as nylon, polypropylene (PP), polyphenylene sulfide (PPS), or acrylonitrile-butadiene-styrene (ABS) resin, or ceramic), and formed into a column-shape. In this embodiment, the exciting coils of the stationary cores in pairs will be described as the coil A and the coil B in description of the signal processing circuit in this embodiment.

The retaining member 490 is a square plate member formed, for example, of synthetic resin (for example, polybutylene terephthalate (PBT), nylon, polyphenylene sulfide (PPS), acrylonitrile-butadiene-styrene (ABS) resin, or fiber reinforced plastic (FRP) which is glass fiber impregnated with epoxy resin, and includes a base portion to be mounted to a lower case 422, and a coil core holders 492, 493 provided at one side end of the base portion.

The retaining member 490 provided with the stationary cores 431, 432 (441, 442), the circuit board 495 provided with the signal processing circuit 400, and the rotor 410 are accommodated in a case 420 formed of metal or insulative magnetic material having a property for shielding the alternating magnetic field. The case 420 is mounted to the fixed member (not shown) located in the vicinity of the shaft S via the bracket, not shown.

Figure 28:
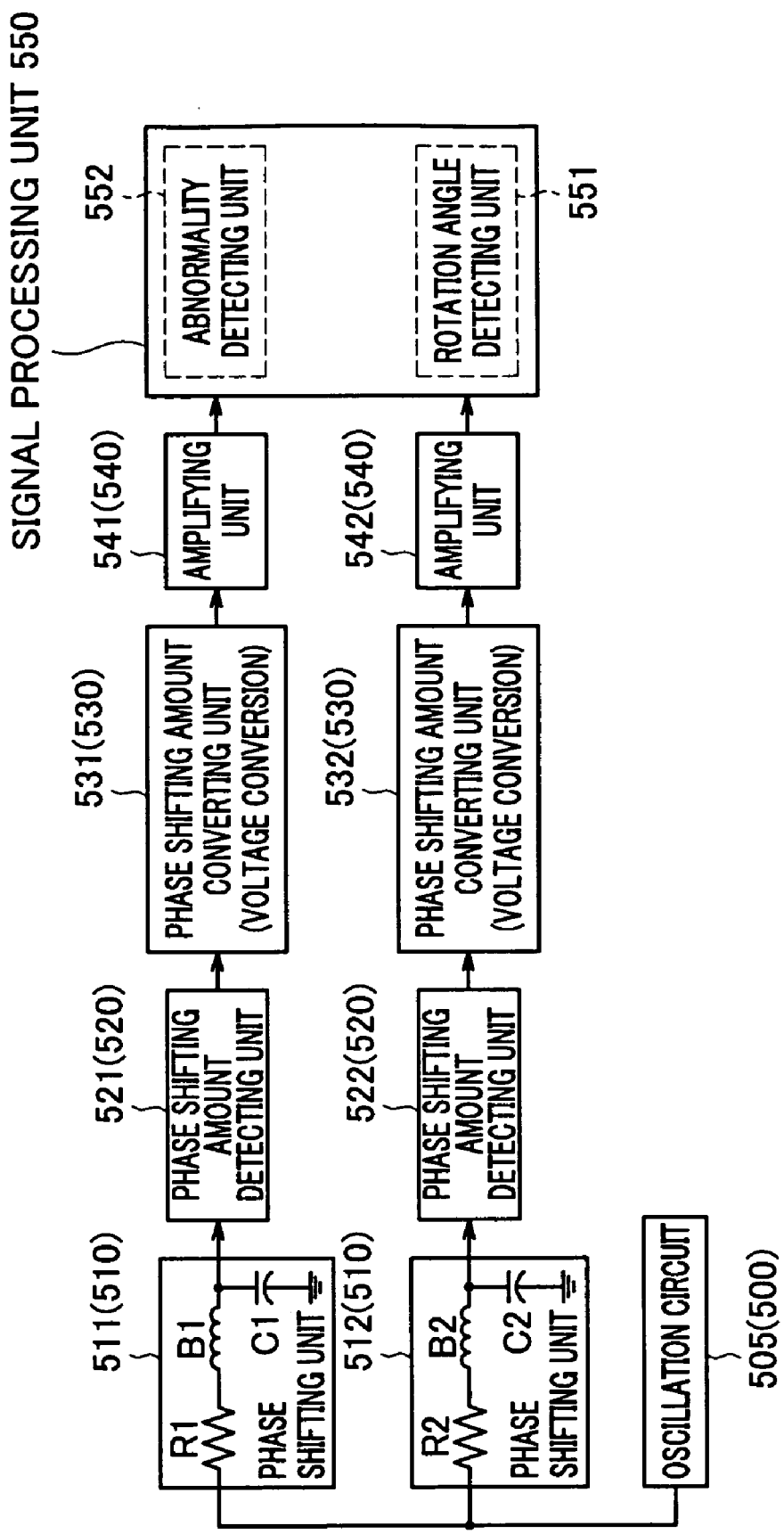
FIG. 28 is a circuit block diagram of the rotation sensor according to the third embodiment of the invention.

The signal processing circuit shown in FIG. 28 is mounted to the circuit board 495 provided on part of the retaining member 490. The signal processing circuit is adapted to be connected to the wire harness for supplying to the power source and signal transmission via a plurality of electric cables (not shown) extending from the case 420 toward the outside, and connected to the external device provided outside the case 420.

As shown in FIG. 27, the rotor 410 includes a rotor mounting portion formed of insulative magnetic material and a sensing unit 412 connected to the rotor mounting portion via the stay member and being continuously changed in width in the circumferential direction. The sensing unit 412 is formed of metal having conductivity such as aluminum, copper, silver, or brass. As shown in FIG. 27, the sensing unit 412 includes a narrow portion which has a narrowest width and a widened portion which has a widest width on the radially opposite side thereof. Then, it is formed so as to vary in radial width corresponding to the rotation angle of the rotor 410, so that an eddy current having a sensing width and a magnitude based on the surface area corresponding to the respective coils is induced with the rotation of the rotor.

In other words, when the AC exciting current is flowed through the respective exciting coils 431b, 432b, 441b, 442b, the respective exciting coils 431b, 432b, 441b, 442b generates an alternating magnetic field in the periphery thereof, and the opposing core body 431a and the core body 441a establish a magnetic circuit in cooperation with each other. Likewise, the opposing core body 432a and the core body 442a establish the magnetic circuit in cooperation with each other. When the magnetic flux crosses the sensing unit 412, an eddy current is induced on the surface of the sensing unit 412, whereby the impedances of the respective exciting coils 431b, 432b, 441b, 442b are varied. The amount of variation of the impedance corresponds to variations in the amount of eddy current induced on the surface of the sensing unit 412. The amount of eddy current induced on the surface of the sensing unit 412 varies depending on the surface area of the sensing unit 412 corresponding to the stationary core (the projecting area with respect to the stationary core of the sensing unit when viewed from the direction orthogonal to the sensing surface of the sensing unit 412, that is, "the project area on the stationary core of the sensing unit"). Therefore, when the rotor 410 rotates, the width of the sensing unit 412 corresponding to the respective stationary cores 431, 432, 441, 442 varies in proportion with the rotation angle of the rotor 410, and accordingly, the impedances in the respective exciting coils 431b, 432b, 441b, 442b vary. The output signals from the respective exciting coils 431b, 432b, 441b, 442b at this time are detected by the signal processing circuit described later (see FIG. 28), and converted into the angle signal of the rotor 410, so that the rotation angle of the rotor 410 can be detected.

The rotation sensor according to the third embodiment of this invention is characterized mainly by the structure of the signal processing circuit. The signal processing circuit of the rotation sensor includes, as shown in the block diagram shown in FIG. 28, an oscillation unit 500 including an oscillation circuit 501 and outputting the oscillation signal of a specific frequency, phase shifting unit 510 (511, 512) for shifting the phase of the oscillation signals supplied from the oscillation unit 500 according to the magnitude of the eddy current generated at the sensing unit 412, phase shifting amount detecting unit 520 (521, 522) for detecting the phase shifting amount, a phase shifting amount converting unit 530 (531, 532) for converting the detecting shifting amount to the corresponding parameter (for example, a voltage value or a digital value), an amplifying unit 540 (541, 542) for amplifying the phase shifting amount outputted from the phase shifting amount converting unit 530, and a signal processing unit 550 for calculating the rotation angle from the parameter corresponding to the phase shifting amount and determining the abnormality of the sensor, so that the respective rotation angles supplied to the phase shifting unit 510 are detected. The signal processing unit 550 includes a rotation angle detecting unit 551 and an abnormality detecting unit 552, so as to determine the abnormality of the sensor when the positional displacement between the sensing unit of the rotor and the exciting coil is within the unallowable range as well as detection of the rotation angle. In this embodiment, although it is not stated, the frequency dividing circuit or the buffer amplifier between the oscillating circuit 501 and the phase shifting unit 510 as needed.

Subsequently, a specific method of signal processing of the rotation sensor 401 according to the third embodiment of the invention will be described. The oscillation circuit 501 transmits oscillation signals of a specific frequency to the respective exciting coils 431b and the coil 441b (coil A), and the coil 432b and the coil 442b (coil B). Accordingly, the respective oscillation signals are outputted to the respective phase shifting units 510 including the resistances R1, R2, the coil B1, B2, and the capacitors C1, C2 shown in FIG. 16B. At this time, the phase of the voltage signal at both ends of the capacitors C1, C2 varies with variations in impedance of the coils B1, B2. The voltage signals at both ends of the capacitors C1, C2 are outputted to the respective phase shifting amount detecting units 520. The respective phase shifting amount detecting units 520 detect the phase shifting amounts of the voltage signals at the both ends of the capacitors C1, C2, respectively. The respective phase shifting amount converting units 530 convert the detected respective phase shifting amounts to the corresponding voltages.

Then, the voltage values are transmitted to the amplifying units 540 (541, 542) connected to the rear stages of the phase shifting amount converting units 530. The amplifier 540 is an electronic circuit including operational amplifier, and saturates to the positive-side supply voltage of the operational amplifier as the upper limit and to the negative-side supply voltage of the operational amplifier (or GND voltage) as the lower limit, so that flat areas are formed on the voltage value corresponding to the phase shifting amount.

The signal processing unit 550 employs, for example, one chip microprocessor as a processing means, and based on the voltage value supplied from the respective amplifying units 540, the rotation angle detecting unit 551 measures the rotation angle of the rotor 410 and the abnormality detecting unit 552 detects abnormality of the rotation sensor 401.

Subsequently, the specific structure for abnormal diagnosis of the rotation sensor 401 according to the third embodiment of the invention will be described. The structure of the abnormality diagnosis of the rotation sensor is such that the upper limit and the lower limit are provided on the amplitude of the phase shifting amount obtained by the phase shifting amount detecting unit 520 of at least either one of the exciting coils (the coil B in this embodiment) by the amplifier 540 to saturate the phase shifting amount to constant values as the upper limit and the lower limit so that the flat areas are positively formed (see FIG. 29 and FIG. 35). Then, the saturated phase shifting amount and the phase shifting amount obtained by the phase shifting amount detecting unit 520 of the other exciting coil (the coil A in this embodiment) are compared to detect the sensor abnormality. The phase shifting amount detecting units 520 of the coil A and coil B are respectively connected to the amplifying unit 540 via the phase shifting amount converting unit 530, and hence the signals for detecting the sensor abnormality are actually the voltage values of the analogue signals.

Figure 29:
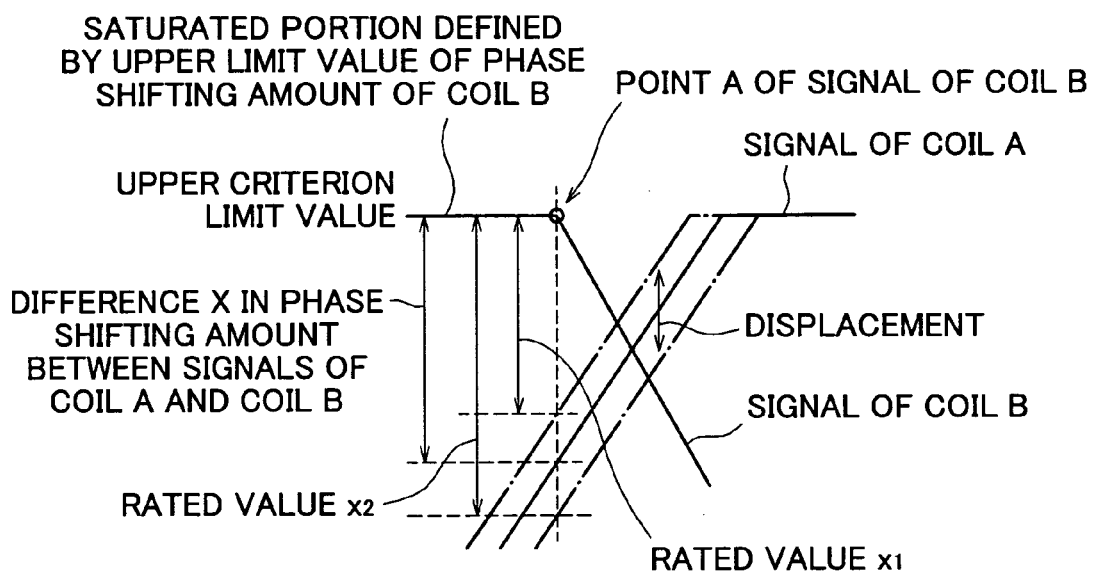
FIG. 29 is a partly enlarged detection characteristic drawing of the phase shifting amount showing a principle of abnormality determination of the rotation sensor according to the third embodiment and a modification of the invention.
Figure 35:
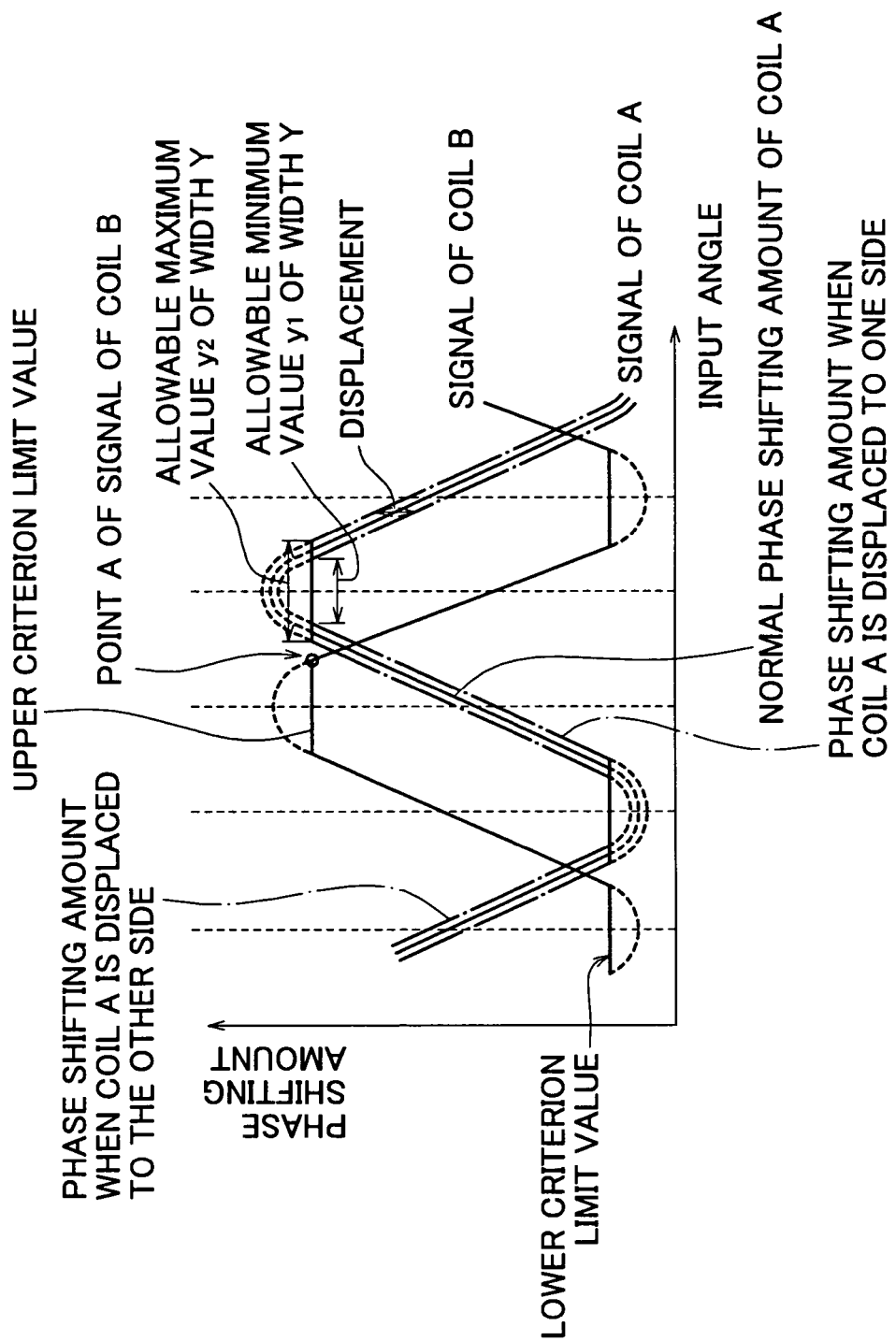
FIG. 35 is a detection characteristic of the phase shifting amount showing a principle of abnormality determination of the rotation sensor according to the third embodiment and the modification thereof of the invention.

A method of diagnosis of the abnormality of the rotation sensor 401 according to the third embodiment of the invention is as follows. As described above, the amplitude with respect to the input angle of the phase shifting amount is provided with the flat areas defined by the upper limit and the lower limit by the amplifying unit 540 (see FIG. 35). Then, as shown in FIG. 29, the phase shifting amount obtained by the impedance of the coil B at a point A which is a border between the flat areas and the normally varying portion is compared with the phase shifting amount obtained by the coil A at a voltage value indicating the phase shifting amount of the coil B. The normal range of the difference X of the phase shifting amount obtained from the impedances of the coil A and the coil B at the input angle including the point A is determined in advance in the stage of design. In FIG. 35, the upper limit value on the normal range is defined by the upper criterion limit value, and the lower limit value is defined by the lower criterion limit value.

In this manner, the phase shifting amount with respect to the input angle has flat portions. Then, as shown in FIG. 29, the phase shifting amount (criterion limit value) at the point A, which is a border between the saturated portion in the phase shifting amount of the coil B and the normally varying portion is compared with the phase shifting amount obtained from the impedance of the coil A at the same input angle. The difference X of the phase shifting amount obtained from the impedances of the coil A and the coil B is compared with a rated value for identifying the normal range, which is determined in advance in the stage of design, to determine whether or not the rotation sensor is normal.

More specifically, when the difference X of the phase shifting amounts at the point A is the rated value $x1<=X<=x2$, it is determined that there is no shift between the exciting coil of the rotation sensor and the sensing unit, or the displacement is within the allowable range, and hence the rotation sensor is normal. In contrast, when the difference X of the phase shifting amount at the point A is X<the rated value x1 or X>the rated value x2, it is determined that there is an unallowable displacement between the exciting coil of the rotation sensor and the sensing unit, and hence the rotation sensor is abnormal. Likewise, it is also possible to obtain the difference of the phase shifting amount at the boundary between the saturated area and the normally varying portion at the lower limit of the voltage value showing the phase shifting amount as described above, and see whether or not it is within the predetermined range to determine whether the rotation sensor is normal or abnormal.

Alternatively, instead of providing both of the upper limit and the lower limit of the voltage value showing the phase shifting amount as described above, it is also possible to provide only one of the upper limit and the lower limit using a limiter such as a diode to determine the sensor abnormality associated with the positional displacement occurred when mounting the rotation sensor only from the above-described one of the upper limit or the lower limit.

In the third embodiment described above, as shown in FIG. 30 to FIG. 32, it is also possible to detect the sensor abnormality by determining the displacement of the intersecting point between the waveform of the phase shifting amount obtained by the phase shifting amount detecting unit 520 of at least either one of the exciting coil (the coil B in this embodiment) and the waveform of the phase shifting amount obtained by the phase shifting amount detecting unit 520 of the other exciting coil (the coil A in this embodiment). In this case, preferably, the upper limit and the lower limit is provided on at least one of the amplitudes by the amplifying unit 540, saturate the phase shifting amount at constant values of the upper limit and the lower limit, and positively form the flat area.

Figure 30:
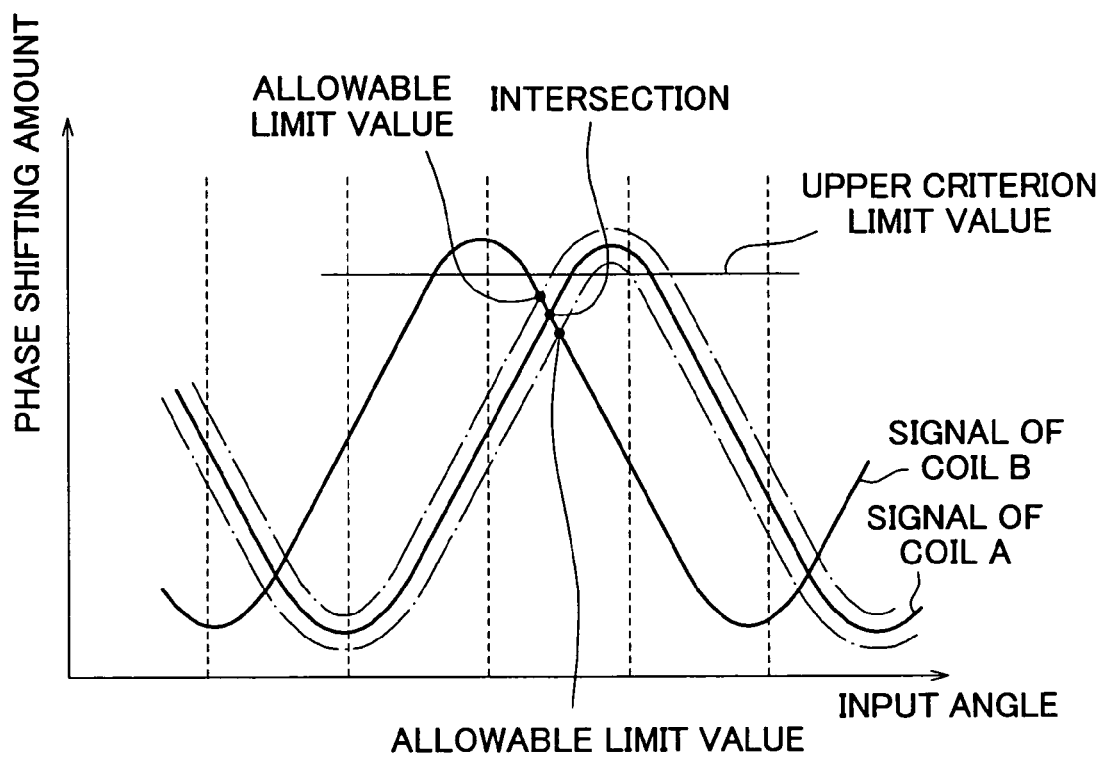
FIG. 30 is a detection characteristic drawing showing a similar example of the principle of abnormality determination of the rotation sensor according to the third embodiment of the invention.
Figure 31:
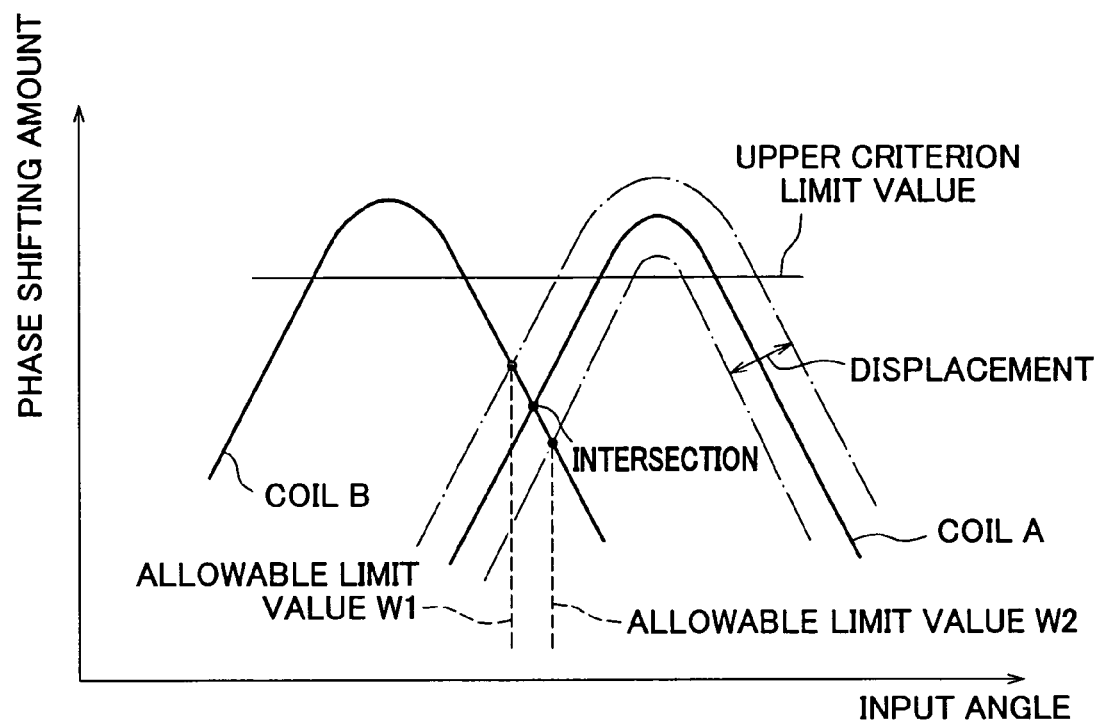
FIG. 31 is a partly enlarged view showing a first method of abnormality determination in the detection characteristic drawing in FIG. 30.
Figure 32:
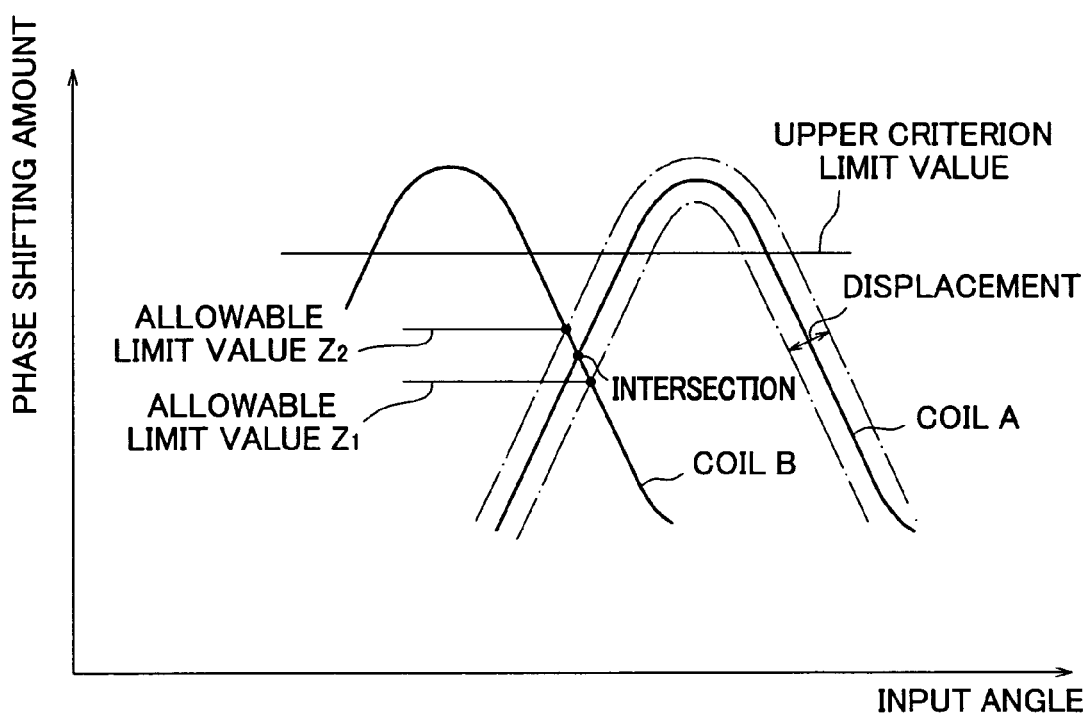
FIG. 32 is a partly enlarged view showing a second method of abnormality determination in the detection characteristic drawing in FIG. 30.

More specifically, instead of the method of determining the sensor abnormality described above, it is also possible to employ a signal processing method as shown in FIG. 30 to FIG. 32. In other words, in the linear area below the upper criterion of the phase shifting amount shown in FIG. 30, for example, the intersection between the signal of the coil A and the signal of the coil B is obtained, displacement of the allowable phase shifting amount of the coil A is obtained as shown by dashed lines in the drawing, and the intersection between the phase shifting amounts of the coil A shown by the dashed lines and the phase shifting amount of the coil B are obtained as the allowable limit values. Subsequently, as shown in FIG. 31, it is also possible to configure in such a manner that if the intersection is within the range between the smallest allowable limit value W1 and the largest allowable limit value W2 relating to the predetermined input angle, it is determined that the sensor is normal, while if it exceeds the range, the sensor is determined to be abnormal. Alternatively, it is also possible to configure in such a manner that if the intersection is within the range between the smallest allowable limit value Z1 of the phase shifting amount and the largest allowable limit value Z2 as shown in FIG. 32, the sensor is determined to be normal, and if it exceeds the range, the sensor is determined to be abnormal.

Subsequently, a first modification of the rotation sensor according to the third embodiment will be described. More specifically, the first modification includes, as shown in the circuit block diagram in FIG. 33, an oscillation unit 600 including an oscillation circuit 601 for outputting the oscillation signal of a specific frequency, a phase shifting unit 610 (611, 612) for shifting the phase of the oscillation signals supplied from the oscillation unit 600 according to the eddy current generated at the sensing unit 412, the phase shifting amount detecting unit 620 (621, 622) for detecting the phase shifting amount, a phase shifting amount converting unit 630 (631, 632) for converting the detected phase shifting amount to the corresponding parameter (for example, the voltage value or the digital value), a setting operation part 640 (641 642) for providing the upper and lower limits in the phase shifting amount outputted from the phase shifting amount converting unit 630, and a signal processing unit 650 for calculating the rotation angle from the parameter corresponding to the phase shifting amount and determining the sensor abnormality, so that the respective rotation angles supplied to the phase shifting unit 610 are detected. The signal processing unit 650 is provided with a rotation angle detecting unit 651 and an abnormality detecting unit 652 so as to determine the sensor abnormality when the positional displacement between the sensing unit of the rotor and the exciting coil are in the unallowable range, as well as detection of the rotation angle. In this modification, the phase shifting amount detecting unit 620 of each of the coil A and the coil B is connected to the setting operation part 640 via the phase shifting amount converting unit 630, and the signal for detecting the sensor abnormality is not actually the phase shifting amount of the analog signal, but the digital signal obtained by converting the phase shifting amount. Although it is not shown in this first modification, it is also possible to provide a frequency dividing circuit or a buffer amplifier between the oscillation circuit 601 and the phase shifting unit 610 as needed.

Subsequently, a specific method of signal processing of the first modification will be described. The oscillation circuit 601 first transmits oscillation signals of a specific frequency to respective pairs of the exciting coil 431$b$ and the coil 441$b$ (coil A), and of the coil 432$b$ and the coil 442$b$ (coil B). Accordingly, the respective oscillation signals are outputted to the respective phase shifting units 610 including the resistances R1, R2, the coils B1, B2, and the capacitors C1, C2 as shown in FIG. 16B. At this time, the phases of the voltage signal at the both ends of the capacitors C1, C2 vary with variations in impedance of the coils B1, B2. The voltage signals at both ends of the capacitors C1, C2 are outputted to the respective phase shifting amount detecting units 620. The phase shifting amount detecting units 620 detect the phase shifting amounts of the voltage signals at both ends of the capacitors C1, C2, respectively. The respective phase shifting amount converting units 630 convert the detected respective phase shifting amounts to corresponding digital signals. The respective setting operation part 640 determines the upper limit value and the lower limit value of the signals outputted from the respective phase shifting amount converting units 630 so that by using the upper limit value and the lower limit value, the setting operation part 640 forms digital values corresponding to the phase shifting amounts for the phase shifting amount of the coil A and the phase shifting amount of the coil B, respectively. The signal processing unit 650 employs, for example, a one-chip microprocessor as the processing means, and, based on the digital signals supplied from the respective setting operation parts 640, the rotation angle detecting unit 651 measures the rotation angle of the rotor 410 and the abnormality detecting unit 652 detects the sensor abnormality.

Figure 33:
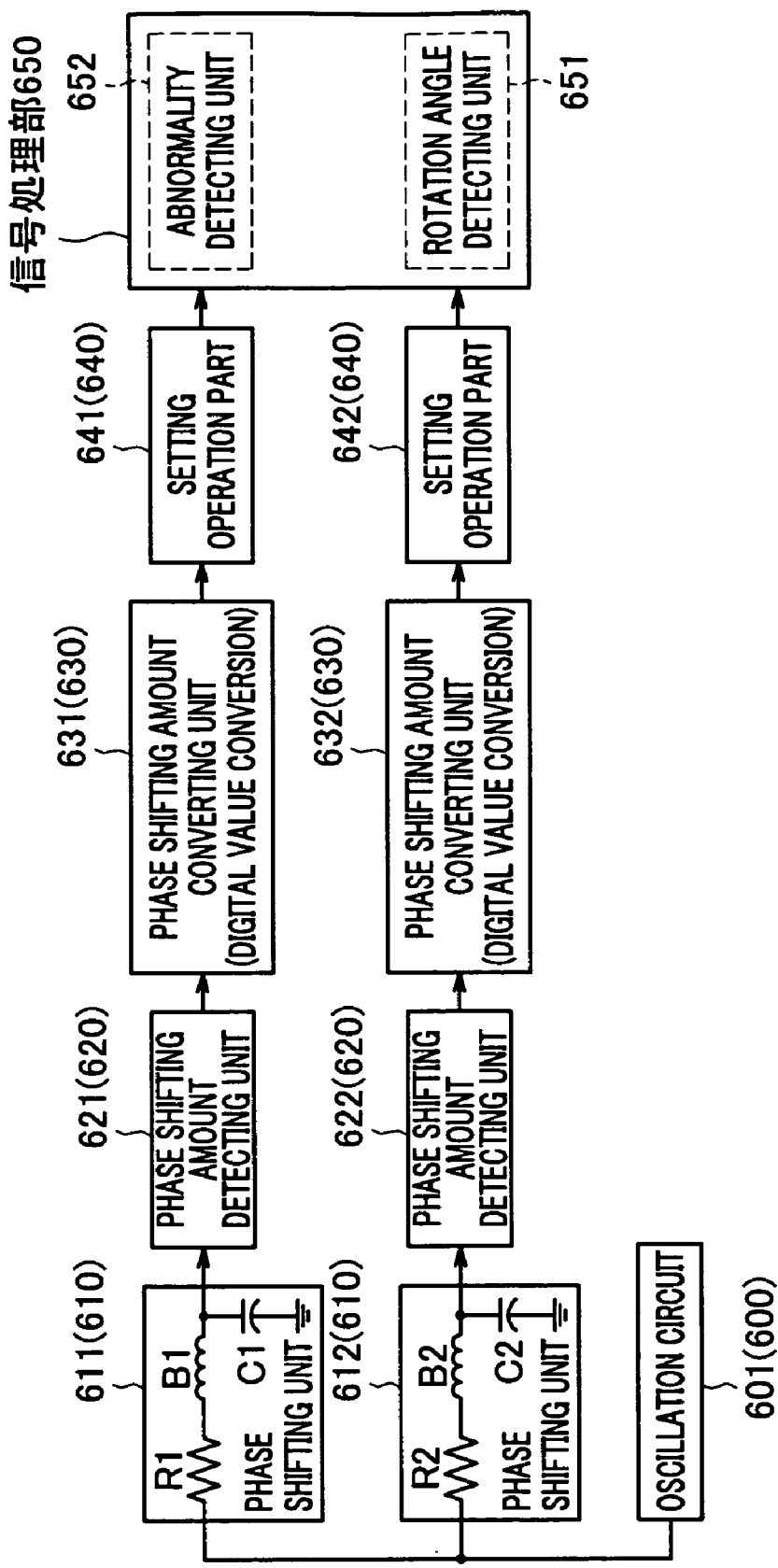
FIG. 33 is a circuit block diagram of the rotation sensor relating to a first modification of the third embodiment of the invention.

Subsequently, the specific structure of abnormality diagnosis of the rotation sensor 402 in the first modification will be described. The structure of abnormality diagnosis of the rotation sensor 402 is such that, as shown in FIG. 33, the upper limit and the lower limit are provided on the amplitude of the phase shifting amount obtained by the phase shifting amount detecting unit 620 of at least either one of the exciting coils (the coil B in this embodiment) by the setting operation parts 640 so that the flat areas are positively formed (see FIG. 29 and FIG. 35). Then, the saturated phase shifting amount and the phase shifting amount obtained by the phase shifting amount detecting unit 620 of the other exciting coil (the coil A in this embodiment) are compared to detect the sensor abnormality.

The method of abnormality diagnosis of the rotation sensor 402 according to the first modification is as follows. More specifically, as shown in FIG. 33, the phase shifting amounts obtained by the phase shifting amount detecting unit 620 are converted into digital signals respectively by the phase shifting amount converting unit 630. Then, the digital values are transmitted to the setting operation part 640 (641, 642) connected to the rear stage of the phase shifting amount converting unit 630. Then, the upper limit and the lower limit of the phase shifting amount are provided at the setting operation part 640 connected to the rear stage of the phase shifting amount converting unit 630 and the phase shifting amount is saturated at the upper limit and the lower limit. More specifically, the setting operation part 640 has predetermined upper criterion limit (see FIG. 29) and lower criterion limit (see FIG. 35), and performs processing such that when the phase shifting amount is a digital value equal to or higher than the upper criterion limit, it is replaced by the upper criterion limit, and when the phase shifting amount is a digital value equal to or lower than the lower criterion limit, it is replaced by the lower criterion limit. With such a processing, the digital value representing the phase shifting amount is saturated so that the upper limit corresponds to the upper criterion limit and the lower limit corresponds to the lower criterion limit.

Accordingly, as shown in FIG. 35, flat saturated areas can be provided for the amplitude with respect to the input angle of the phase shifting amount respectively at the upper limit and the lower limit. Although the phase shifting amount is represented by the analogue value in FIG. 35, in this modification, these values are quantized, and the phase shifting amount is outputted for each rotation angle as the digital value, so that the upper limit value is defined by the upper criterion limit value, and the lower limit value is defined by the lower criterion limit value.

In this manner, the phase shifting amount with respect to the input angle includes saturated portions. Then, as shown in FIG. 29, the phase shifting amount at the point A as a boundary between the saturated portion of the phase shifting amount of the coil B and the normally varied portion is compared with the phase shifting amount obtained from the impedance of the coil A at the same input angle.

The difference X of the phase shifting amounts obtained from the impedances of the coil A and coil B has a rated value which specifies the normal range in advance in the stage of design, so that whether or not the rotation sensor is normal can be determined by comparing the value X with the rated value.

More specifically, the difference X of the phase shifting amount at the point A is the rated value x1<=X<=x2, it is determined that there is no displacement between the exciting coil of the rotation sensor and the sensing unit or the displacement is within the allowable range, and hence the rotation sensor is determined to be normal. When the difference X of the phase shifting amount at the point A is X<rated value x1, or X>rated value x2, it is determined that there is an unallowable displacement between the exciting coil of the rotation sensor and the sensing unit, and hence the rotation sensor is determined to be abnormal. Likewise, it is also possible to determine whether the rotation sensor is normal or abnormal by obtaining the difference of the phase shifting amount at the boundary between the saturated area at the lower limit of the digital value of the phase shifting amount and the normally varying portion as described above and seeing whether or not the difference is within the predetermined range.

Instead of providing both of the upper and lower limits of the digital value representing the phase shifting amount as described above, it is also possible to provide only one of the upper limit and the lower limit and determine the sensor abnormality associated with the positional displacement occurred when mounting the rotation sensor only from the digital value of the phase shifting amount of the above described one of the upper limit or the lower limit.

Subsequently, a second modification of the aforementioned third embodiment will be described. In the second modification, the exciting coil is disposed on the rotor sensing unit at the circumferentially predetermined position, and the exciting coil is connected to the oscillation unit, the phase shifting unit, and the phase shifting amount detecting unit.

Figure 34:
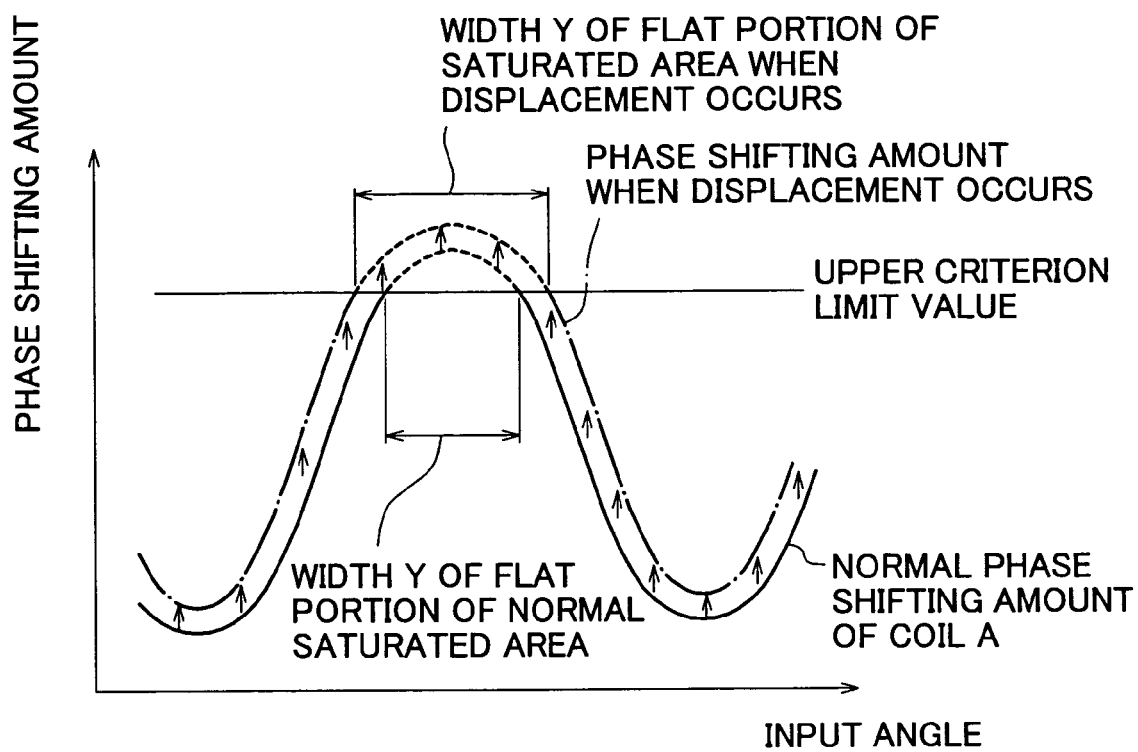
FIG. 34 is a detection characteristic drawing of the phase shifting amount showing a principle of the abnormality determination of the rotation sensor according to a second modification of the third embodiment of the invention.

The signal processing circuit of the second modification (not shown) is configured as follows. The phase shifting amount detecting unit is connected to the phase shifting amount converting unit, so that the phase shifting amount is converted into the voltage value. The phase shifting amount converting unit is connected to the amplifying unit, and as in the embodiment described above, the phase shifting amount converted into the voltage value is saturated at the upper limit and the lower limit by changing the gain of the amplifying unit. Then, the saturated area of the saturated phase shifting amount and the predetermined threshold value are compared to detect the sensor abnormality. More specifically, as shown in FIG. 34, when the width Y of the flat portion in the saturated area of the voltage value of the phase shifting amount exceeds the threshold value defined by a width of a certain range shown in FIG. 35 (the allowable minimum width y1 and the allowable maximum width y2), it is understood that the phase shifting amount is displaced to the unallowable range in the vertical direction. Since it indicates that the exciting coil is displaced to the unallowable range in the radial direction of the sensing unit, it is determined in this case to be abnormality of the rotation sensor.

In this manner, even when the exciting coil is disposed on the sensing unit only at one position in the circumferential direction, when the shifting amount of the output associated with displacement occurred when mounting the rotation sensor falls within the unallowable range, the rotation sensor can be determined to be abnormal without adding any specific abnormality diagnosis circuit by comparing the width of the saturated area of the voltage value of the saturated phase shifting amount and the predetermined threshold value.

Alternatively, instead of saturating the phase shifting amount at the predetermined upper limit and the lower limit by changing the gain of the amplifying unit as in the second modification, it is also possible to saturate both or either one of the upper and lower limit of the voltage value of the phase shifting amount via a limiter circuit employing a diode, and determine the abnormality of the rotation sensor based on the width of the area of the saturated flat portion.

In the second modification, it is also possible to convert the phase shifting amount to a digital value by the phase shifting amount converting unit and perform the abnormality diagnosis based on the digital value as in the first modification described above.

Although the abnormality determination of the rotation sensor can be performed with only one exciting coil in the second modification, even when the rotation sensor is provided with the plurality of exciting coils, it is possible to determine abnormality of the rotation sensor using only any one of the exciting coils, and also possible to perform the abnormality determination of the rotation sensor respectively by the respective exciting coils based on the phase shifting amount of the respective exciting coils. Accordingly, when the rotation sensor is mounted in a state in which the exciting coil is displaced to an unallowable degree in the radial direction of the sensing unit, the rotation sensor can be always determined to be abnormal.

In other words, according to the third embodiment, the rotation sensor that can determine abnormality of the rotation sensor without detecting the rotation angle including the detection error when an unallowable positional displacement occurs between the sensing unit of the rotor and the exciting coil of the rotation sensor.

Figure 36:
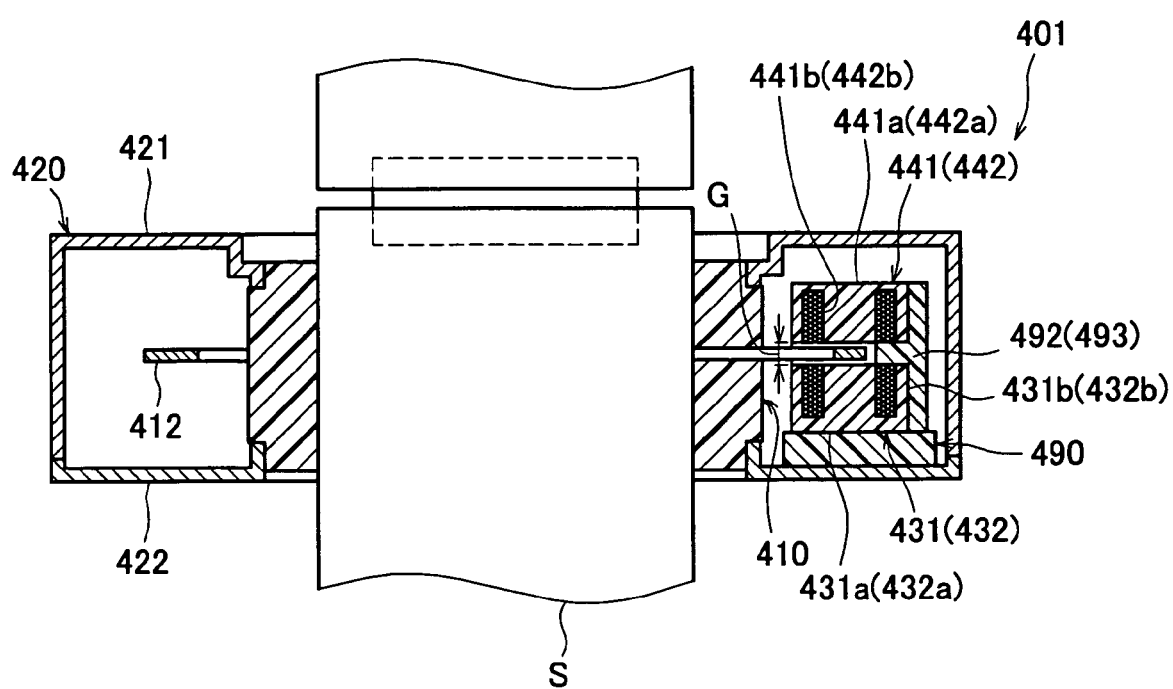
FIG. 36 is a cross-sectional view showing a modification of the internal structure of the rotary sensor according to the respective embodiments of the invention.

In other words, in all the embodiments described above, the coil core 492 may have a structure of being placed on the retaining member 490 as shown in FIG. 36. In this case, the retaining member 490 may serve as the circuit board. More specifically, as shown in FIG. 36, there are provided core bodies 431a, 432a which have a ring shape cavity part in the upper surface side respectively for accommodating the exciting coils and the exciting coils 431b, 432b accommodated in the core bodies 431a, 432a. Likewise, the stationary cores 441, 442 on the other side also include core bodies 441a, 442a formed of insulative magnetic material and exciting coils 441b, 442b accommodated in the core bodies 441a, 442a. Then, the pair of the exciting coils 431b, 432b and the pair of the exciting coils 441b, 442b are connected in series respectively, are electrically connected to the signal processing circuit of the retaining member 490, and form a alternating magnetic field around the coils by allowing AC exciting current to flow therein, so that a magnetic circuit is established between the pairs of stationary cores.

The rotation sensor according to the invention described above based on the various embodiments is suitable for detecting the rotation angle of the steering device for the vehicle which requires easiness of mounting operation and high detecting accuracy is necessary, is significantly subjected to vibrations, and is obliged to allow rattling between the sensing unit of the rotor and the exciting coil to some extent. However, the rotation sensor according to the invention may be applied to any structure such as those obtaining the relative rotation angle or the rotation torque between the revolving shafts which rotate while vibrating as a robot arm, or those having such possibility that the sensing unit of the rotor and the exciting coil may be displaced depending on the mounting state.

We claim:

1. A rotation sensor for detecting a rotation angle of a rotating shaft comprising:
    a rotor mounted to the rotating shaft and having a conductive sensing unit whereof the width varies in the circumferential direction; and
    stationary cores each including an exciting coil for forming a magnetic circuit with respect to the sensing unit of the rotor by allowing AC exciting current to flow therein, and a core body formed of magnetic material and retaining the exciting coil, and being mounted to a fixed member and disposed so as to oppose to the sensing unit of the rotor at a distance in the axial direction of the shaft,
    wherein the stationary cores are disposed only at two positions each having a central angle with respect to the axis of the shaft other than substantially 180°.

2. The rotation sensor according to claim 1, wherein the stationary cores at each of said two positions are provided in pairs opposed above each other with the intermediary of the sensing unit of the rotor.

3. The rotation sensor according to claim 1, wherein the center angle formed between the stationary cores at the two positions with respect to the axis of the shaft is substantially 90°.

4. The rotation sensor according to claim 1, wherein the exciting coils are connected to an oscillation unit, a phase shifting unit, and a phase shifting amount detecting unit respectively, and
    wherein the rotation angle of the rotor is detected based on the phase shifting amounts obtained by the phase shifting amount detecting unit of the respective exciting coils and the phase shifting amounts obtained by reversing the phase shifting amounts.

5. The rotation sensor according to claim 4, wherein in the case in which the difference between the respective phase shifting amounts and the respective reversed phase shifting amount is within a certain range, it is determined to be a joint portion of the plurality of the output ranges of phase shifting amounts for detecting the rotation angle of the rotor or a section in the vicinity thereof.

6. The rotation sensor according to claim 1, further comprising a case for accommodating the rotor, the fixing member, and the stationary core and having a mounting engagement portion to be mounted to a mounting member on the partner side, wherein the stationary cores are disposed symmetrically with respect to a connecting line to connect a center axis of the rotating shaft and the mounting engagement portion of the case.

7. The rotation sensor according to claim 1, wherein the exciting coils of the respective stationary cores form a phase shifting unit, and the phase shifting unit is connected to the oscillating unit and the phase shift amount detecting unit; and
    wherein a sensor abnormality is detected based on the
    relation between the value of the phase shifting amount obtained by the phase shifting amount detecting unit of either one of the plurality of the exciting coils and the value of the phase shifting amount obtained by the phase shifting amount detecting unit of the other exciting coil.

8. The rotating sensor according to claim 7,
    wherein a determination criterion limit value is determined for the amplitude of the phase shifting amount obtained by the phase shifting amount detecting unit connected to any one of the plurality of the exciting coils, and using the criterion reference value determined by the relation between the determination reference limit value and the amplitude of the phase shifting amount obtained by the phase shifting amount detecting unit connecting to either one of the plurality of the exciting coils, the sensor abnormality is detected based on the value of the phase shifting amount obtained by the phase shifting amount detecting unit of another exciting coil,
    a portion for comparing the phase shifting amount of either one of the plurality of the exciting coils with the phase shifting amount of the other exciting coil is a boundary between a flat portion representing the criterion reference limit value of the phase shifting amount of the either one of the exciting coils and a normally varying portion.

9. The rotation sensor according to claim 7, wherein the rotation sensor comprises a phase shifting amount converting unit, and the processing signal for detecting the sensor abnormality is a voltage converted from the phase shifting amount.

10. The rotation sensor according to claim 7, wherein the rotation sensor includes the phase shifting amount converting unit; and
wherein the processing signal for detecting the sensor abnormality is a digital signal converted from the phase shifting amount.

11. The rotation sensor according to claim 1, wherein the exciting coils of the respective stationary cores form the phase shifting unit, and the phase shifting unit is connected to the oscillation unit and the phase shifting amount detecting unit,
wherein the sensor abnormality is detected by determining any one of the upper limit or the lower limit for the amplitude of the phase shifting amount obtained by phase shifting amount detecting unit connected to the exciting coil, the phase shifting amount is flattened at a certain constant value, and comparing the width of the flat area of the flattened phase shifting amount with a predetermined threshold.

* * * * *